United States Patent
Ryu et al.

(10) Patent No.: US 11,991,739 B2
(45) Date of Patent: May 21, 2024

(54) METHOD AND DEVICE FOR ALLOCATING TRANSMISSION POWER IN WIRELESS COMMUNICATION SYSTEM

(71) Applicant: Samsung Electronics Co., Ltd., Gyeonggi-do (KR)

(72) Inventors: Hyunseok Ryu, Gyeonggi-do (KR); Jeongho Yeo, Gyeonggi-do (KR); Jinyoung Oh, Gyeonggi-do (KR); Sungjin Park, Gyeonggi-do (KR); Jonghyun Bang, Gyeonggi-do (KR); Cheolkyu Shin, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 280 days.

(21) Appl. No.: 17/421,571

(22) PCT Filed: Jan. 7, 2020

(86) PCT No.: PCT/KR2020/000282
§ 371 (c)(1),
(2) Date: Jul. 8, 2021

(87) PCT Pub. No.: WO2020/145633
PCT Pub. Date: Jul. 16, 2020

(65) Prior Publication Data
US 2022/0070879 A1 Mar. 3, 2022

(30) Foreign Application Priority Data
Jan. 9, 2019 (KR) .......... 10-2019-0002939

(51) Int. Cl.
*H04W 72/56* (2023.01)
*H04W 56/00* (2009.01)
(Continued)

(52) U.S. Cl.
CPC ......... *H04W 72/56* (2023.01); *H04W 56/001* (2013.01); *H04W 72/0473* (2013.01); *H04W 72/20* (2023.01); *H04W 92/18* (2013.01)

(58) Field of Classification Search
CPC ............... H04W 72/56; H04W 56/001; H04W 72/0473; H04W 72/20; H04W 92/18;
(Continued)

(56) References Cited

U.S. PATENT DOCUMENTS

2013/0324182 A1  12/2013  Deng et al.
2014/0112233 A1   4/2014  Bodas et al.
(Continued)

FOREIGN PATENT DOCUMENTS

CN  106797265  5/2017
CN  107925538  4/2018
(Continued)

OTHER PUBLICATIONS

Qualcomm Incorporated, Summary of Coexistence Aspects in NR-V2X Study (AI 7.2.4.5), R1-1814301, 3GPP TSG RAN WG1 Meeting #95, Nov. 12-16, 2018, 5 pages.
(Continued)

*Primary Examiner* — Dady Chery
(74) *Attorney, Agent, or Firm* — The Farrell Law Firm, P.C.

(57) ABSTRACT

The present disclosure relates to a communication method and system for converging a 5$^{th}$-Generation (5G) communication system for supporting higher data rates beyond a 4$^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety (Continued)

services. The present disclosure provides a method and a device for allocating transmission power in a wireless communication system.

10 Claims, 14 Drawing Sheets

(51) Int. Cl.
  *H04W 72/044* (2023.01)
  *H04W 72/20* (2023.01)
  *H04W 92/18* (2009.01)
(58) Field of Classification Search
  CPC ... H04W 76/14; H04W 88/06; H04W 52/346; H04W 52/383; H04W 52/367; H04W 4/40
  See application file for complete search history.

(56) References Cited

U.S. PATENT DOCUMENTS

| | | | |
|---|---|---|---|
| 2017/0272299 | A1 | 9/2017 | Chae et al. |
| 2017/0295559 | A1 | 10/2017 | Agiwal et al. |
| 2017/0367087 | A1 | 12/2017 | Seo |
| 2018/0092087 | A1 | 3/2018 | Lju et al. |
| 2018/0206253 | A1 | 7/2018 | Yun et al. |
| 2018/0323930 | A1* | 11/2018 | Ahn .............. H04L 5/0037 |
| 2019/0174547 | A1* | 6/2019 | Khoryaev .......... H04W 4/46 |

FOREIGN PATENT DOCUMENTS

| | | |
|---|---|---|
| WO | WO 2018/031086 | 2/2018 |
| WO | WO 2018/062969 | 4/2018 |
| WO | WO 2018/064131 | 4/2018 |

OTHER PUBLICATIONS

ITL, "Considerations on Sidelink Synchronization for NR V2X", R1-1813493, 3GPP TSG RAN WG1 Meeting #95, Nov. 12-16, 2018, 7 pages.
Ericsson, "Frame Structure for D2D-Enabled LTE Carriers", R1-141387, 3GPP TSG RAN WG1 Meeting #76bis, Mar. 31-Apr. 4, 2014, 4 pages.
European Search Report dated Jan. 4, 2022 issued in counterpart application No. 20739166.5-1215, 12 pages.
International Search Report dated Apr. 13, 2020 issued in counterpart application No. PCT/KR2020/000282, 5 pages.
Written Opinion dated Apr. 13, 2020 issued in counterpart application No. PCT/KR2020/000282, 4 pages.
Intel Corporation, 'In-device coexistence mechanisms for eV2X services', R1-1812496, 3GPP TSG RAN WG1 Meeting #95, Spokane, USA, Nov. 3, 2018, pp. 13.
ZTE et al., 'Coexistence between NR V2X and LTE V2X', R1-1813178, 3GPP TSG RAN WG1 Meeting #95, Spokane, USA, Nov. 3, 2018, pp. 6.
LG Electronics, 'Discussion on coexiste nce mechanism for NR V2X', R1-1812848, 3GPP TSG RAN WG1 Meeting #95, Spokane, USA, Nov. 3, 2018, pp. 4.
Chinese Office Action dated Sep. 25, 2023 issued in counterpart application No. 202080019827.0, 22 pages.
Samsung, "Discussion on QoS Management for NR V2X", R1-1808783, 3GPP TSG RAN WG1 Meeting #94, Aug. 20-24, 2018, 2 pages.
Oppo, "Discussion on Coexistence in NR-V2X", R1-1812830, 3GPP TSG-RAN WG1 Meeting #95, Nov. 12-16, 2018, 4 pages.
European Search Report dated Feb. 8, 2024 issued in counterpart application No. 20739166.5-1215, 10 pages.
Chinese Office Action dated Feb. 23, 2024 issued in counterpart application No. 202080019827.0, 16 pages.

* cited by examiner (a) In-coverage scenario (b) Partial coverage scenario (c) Out-of-coverage scenario (d) Inter-cell V2X Communication scenario (a) Unicast V2X communication (b) Groupcast V2X communication (a) Illustration for P_NR + P_LTE < P_Total (b) Illustration for P_NR + P_LTE > P_Total (a) Illustration for P_Uu + P_Side > P_Total (b) Illustration for P_Uu + P_Side > P_Total

METHOD AND DEVICE FOR ALLOCATING TRANSMISSION POWER IN WIRELESS COMMUNICATION SYSTEM

PRIORITY

This application is a National Phase Entry of PCT International Application No. PCT/KR2020/000282 which was filed on Jan. 7, 2020, and claims priority to Korean Patent Application No. 10-2019-0002939, which was filed on Jan. 9, 2019, the entire content of each of which is incorporated herein by reference.

TECHNICAL FIELD

The disclosure relates to a method for distributing and allocating transmission power in a wireless communication system and, more particularly, to a method and apparatus for a New Radio (NR) Vehicle-to-Everything (V2X) UE, which can communicate through one or more links among NR uplink, Long Term Evolution (LTE) uplink, NR sidelink and LTE sidelink, to distribute and allocate transmission power.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology. As various services can be provided with the advancement of mobile communication systems as described above, a method for effectively providing these services is required.

DISCLOSURE OF INVENTION

Technical Problem

The disclosure relates to a method for an NR V2X UE to allocate and distribute transmission power when the UE performs communication through one or more links.

Solution to Problem

The technical objectives to be achieved in the embodiments of the disclosure are not limited to those mentioned above, and other technical objectives not mentioned will be clearly understood by those of ordinary skill in the art to which the disclosure belongs from the following description.

In the disclosure for solving the above problem, a method of a user equipment (UE) in a wireless communication system includes: detecting first sidelink transmission using a first radio access technology (RAT) and second sidelink transmission using a second RAT; determining whether the first sidelink transmission and the second sidelink transmission overlap; determining a sidelink to be transmitted in case that the first sidelink transmission and the second sidelink transmission overlap; and transmitting sidelink information in the determined sidelink.

In some examples, determining a sidelink to be transmitted is determining based on priority information included in sidelink control information (SCI).

In some examples, transmitting sidelink information is transmitting sidelink information whose priority included in the priority information is high.

In some examples, the first RAT is of fourth generation (4G) and the second RAT is of fifth generation (5G).

In some examples, determining a sidelink to be transmitted is determining based on priority information indicated by higher layers in case that the first sidelink transmission and the second sidelink transmission overlap.

In some examples, transmitting sidelink information is transmitting a sidelink synchronization signal whose priority included in the priority information is high.

In some examples, transmitting sidelink information is determining based on priority information predetermined according to a type of a physical layer channel and transmitting a high-priority sidelink.

In some examples, the first sidelink transmission using the first RAT and the second sidelink transmission using the second RAT are determined based on capabilities of the UE.

In another example of the present disclosure, a UE includes: a transceiver capable of transmitting and receiving at least one signal; and a controller coupled to the transceiver, wherein the controller is configured to: detect first sidelink transmission using a first radio access technology (RAT) and second sidelink transmission using a second RAT; determine whether the first sidelink transmission and the second sidelink transmission overlap; determine a sidelink to be transmitted in case that the first sidelink transmission and the second sidelink transmission overlap; and transmit sidelink information in the determined sidelink.

Advantageous Effects of Invention

According to the proposed embodiments, when the V2X UE performs communication through one or more links, the transmission power of the UE is efficiently allocated and distributed, enabling smooth communication.

MODE FOR THE INVENTION

Figure 1A:
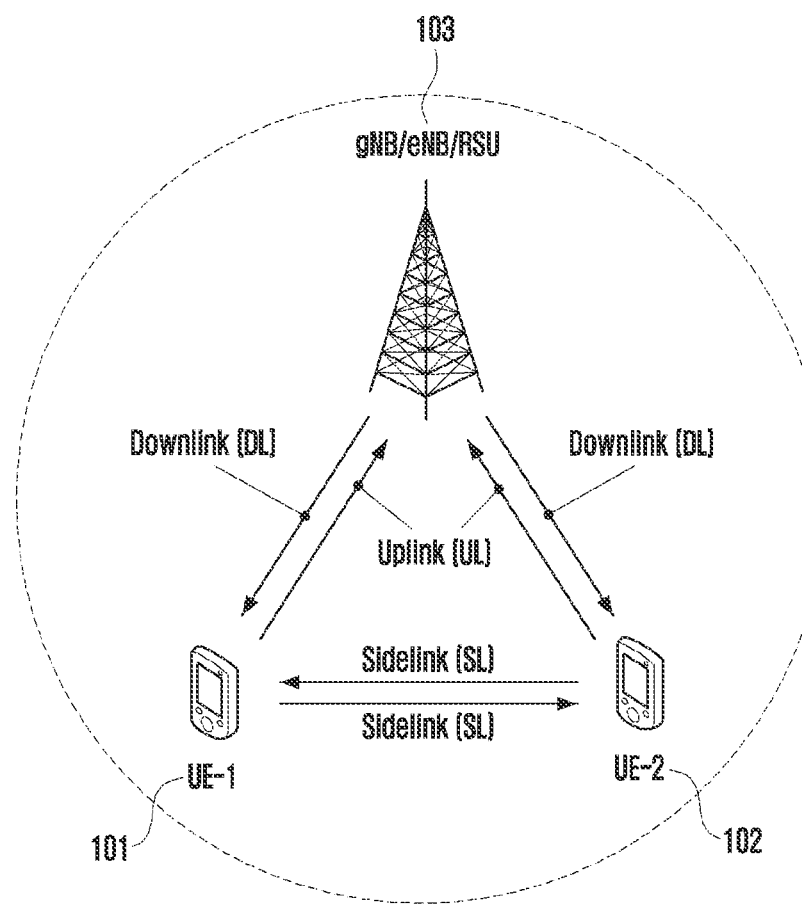
FIG. 1A is an example of a system for describing an embodiment of the disclosure.

Hereinafter, embodiments of the disclosure will be described in detail with reference to the accompanying drawings.

In the description of embodiments of the disclosure, descriptions of technical details well known in the art and not directly related to the disclosure may be omitted. This is to more clearly convey the gist of the disclosure without obscurities by omitting unnecessary descriptions.

Likewise, in the drawings, some elements are exaggerated, omitted, or only outlined in brief. Also, the size of each element does not necessarily reflect the actual size. The same reference symbols are used throughout the drawings to refer to the same or corresponding parts.

Advantages and features of the disclosure and methods for achieving them will be apparent from the following detailed description of embodiments taken in conjunction with the accompanying drawings. However, the disclosure is not limited to the embodiments disclosed below but may be implemented in various different ways, the embodiments are provided only to complete the disclosure and to fully inform the scope of the disclosure to those skilled in the art to which the disclosure pertains, and the disclosure is defined only by the scope of the claims. The same reference symbols are used throughout the specification to refer to the same parts.

Meanwhile, it will be appreciated that blocks of a flowchart and a combination of flowcharts may be executed by computer program instructions. These computer program instructions may be loaded on a processor of a general purpose computer, special purpose computer, or programmable data processing equipment, and the instructions executed by the processor of a computer or programmable data processing equipment create a means for carrying out functions described in blocks of the flowchart. To implement the functionality in a certain way, the computer program instructions may also be stored in a computer usable or readable memory that is applicable in a specialized computer or a programmable data processing equipment, and it is possible for the computer program instructions stored in a computer usable or readable memory to produce articles of manufacture that contain a means for carrying out functions described in blocks of the flowchart. As the computer program instructions may be loaded on a computer or a programmable data processing equipment, when the computer program instructions are executed as processes having a series of operations on a computer or a programmable data processing equipment, they may provide steps for executing functions described in blocks of the flowchart.

Additionally, each block of a flowchart may correspond to a module, a segment or a code containing one or more executable instructions for executing one or more logical functions, or to a part thereof. It should also be noted that functions described by blocks may be executed in an order different from the listed order in some alternative cases. For example, two blocks listed in sequence may be executed substantially at the same time or executed in reverse order according to the corresponding functionality.

Here, the word "unit", "module", or the like used in the embodiments may refer to a software component or a hardware component such as an FPGA or ASIC capable of carrying out a function or an operation. However, "unit" or the like is not limited to hardware or software. A unit or the like may be configured so as to reside in an addressable storage medium or to drive one or more processors. For example, units or the like may refer to components such as a software component, object-oriented software component, class component or task component, processes, functions, attributes, procedures, subroutines, program code segments, drivers, firmware, microcode, circuits, data, databases, data structures, tables, arrays, or variables. A function provided by a component and unit may be a combination of smaller components and units, and it may be combined with others to compose larger components and units. Further, components and units may be implemented to drive one or more processors in a device or a secure multimedia card. In addition, a unit or the like may include one or more processors in an embodiment.

In describing the embodiments of the disclosure in detail, the main focus is placed on the radio access network (new RAN (NR)) and the packet core (5G system, 5G core network, or next generation core (NG core)) being the core network according to the 5G mobile communication standard specified by 3GPP being a mobile communication standardization organization, but it should be understood by those skilled in the art that the subject matter of the disclosure is applicable to other communication systems having similar technical backgrounds without significant modifications departing from the scope of the disclosure.

In the 5G system, to support network automation, a network data collection and analysis function (NWDAF), which is a network function that provides a function to analyze and provide data collected from a 5G network, may be defined. The NWDAF can collect/store/analyze information from the 5G network and provide results to unspecified network functions (NFs), and the analysis results can be used independently by each NF.

Hereinafter, for convenience of description, some terms and names defined in the 3rd Generation Partnership Project Long Term Evolution (3GPP) standards (standards of 5G, NR, LTE, or similar systems) may be used. However, the disclosure is not limited by these terms and names, and may be equally applied to systems conforming to other standards.

Additionally, in the following description, terms for identifying access nodes, terms referring to network entities, terms referring to messages, terms referring to interfaces between network entities, and terms referring to various identification information are exemplified for convenience of description. Hence, the disclosure is not limited to the terms used, and other terms referring to entities having equivalent technical meanings may be used.

To meet the ever increasing demand for wireless data traffic since the commercialization of 4G communication systems, efforts have been made to develop improved 5G communication systems (NR, New Radio). To achieve high data rates, the 5G communication system has been designed to support the extremely high frequency (mmWave) band (e.g., 28 GHz frequency band). To decrease path loss of radio waves and increase the transmission distance of radio waves in the mmWave band, various technologies including beamforming, massive multiple-input multiple-output (massive MIMO), full dimensional MIMO (FD-MIMO), array antennas, analog beamforming, and large scale antennas are considered for 5G communication systems. Additionally, unlike LTE, the 5G communication system supports various subcarrier spacings such as 15 kHz, 30 kHz, 60 kHz, and 120 kHz, the physical control channel uses polar coding, and the physical data channel uses low density parity check (LDPC). In addition, not only DFT-S-OFDM but also CP-OFDM are used as a waveform for uplink transmission. While LTE supports HARQ (hybrid ARQ) retransmission in units of transport blocks (TBs), 5G may additionally support HARQ retransmission based on a code block group (CBG) in which several code blocks (CBs) are bundled.

In addition, to improve system networks in 5G communication systems, technology development is under way regarding evolved small cells, advanced small cells, cloud radio access networks (cloud RANs), ultra-dense networks, device-to-device (D2D) communication, wireless backhaul, vehicle communication networks (Vehicle-to-Everything (V2X) networks), cooperative communication, coordinated multi-points (CoMP) communication, interference cancellation, and the like.

Meanwhile, the Internet is evolving from a human centered network where humans create and consume information into the Internet of Things (IoT) where distributed elements such as things exchange and process information. There has also emerged the Internet of Everything (IoE) technology that combines IoT technology with big data processing technology through connection with cloud servers. To realize IoT, technology elements related to sensing, wired/wireless communication and network infrastructure, service interfacing, and security are needed, and technologies interconnecting things such as sensor networks, machine-to-machine (M2M) or machine type communication (MTC) are under research in recent years. In IoT environments, it is possible to provide intelligent Internet technology services, which collect and analyze data created by interconnected things to add new values to human life. Through convergence and combination between existing information technologies and various industries, IoT technology may be applied to various areas such as smart homes, smart buildings, smart cities, smart or connected cars, smart grids, health-care, smart consumer electronics, and advanced medical services.

Accordingly, various attempts are being made to apply 5G communication systems to IoT networks. For example, technologies such as sensor networks and machine-to-machine (M2M) or machine type communication (MTC) are being realized by use of 5G communication technologies including beamforming, MIMO, and array antennas. Application of cloud RANs as a big data processing technique described above may be an instance of convergence of 3eG technology and IoT technology. In this way, a plurality of services may be provided to the user in a communication system, and to provide such a plurality of services to the user, a method that can provide individual services within the same time interval according to their characteristics and an apparatus using the same are required. Various services provided in the 5G communication system are being investigated, and one of them is a service that satisfies the requirements of low latency and high reliability.

In the case of vehicle communication, standardization of LTE-based V2X using a device-to-device (D2D) communication structure has been completed in 3GPP Rel-14 and Rel-15, and efforts are currently underway to develop V2X based on 5G New Radio (NR). NR V2X is scheduled to support unicast communication between UEs, groupcast (or multicast) communication, and broadcast communication. In addition, unlike LTE V2X which aims to transmit and receive basic safety information necessary for the vehicle to drive on the road, NR V2X aims to provide more advanced services such as platooning, advanced driving, extended sensor, and remote driving.

The NR V2X UE may perform uplink transmission to an NR base station or LTE base station, and may perform V2X communication with another NR V2X UE or LTE V2X UE. As an example, the NR V2X UE may perform single transmission or simultaneous transmission as follows.

A case of performing single transmission using one link among NR uplink, LTE uplink, NR sidelink, and LTE sidelink A case of performing simultaneous transmission using two links Simultaneous transmission of NR uplink and NR sidelink Simultaneous transmission of NR uplink and LTE sidelink Simultaneous transmission of NR uplink and LTE uplink
Simultaneous transmission of NR sidelink and LTE uplink
Simultaneous transmission of NR sidelink and LTE sidelink
Simultaneous transmission of LTE sidelink and LTE Uu
A case of performing simultaneous transmission using three links
Simultaneous transmission of NR sidelink, LTE sidelink and NR uplink
Simultaneous transmission of NR sidelink, LTE sidelink and LTE uplink
Simultaneous transmission of NR sidelink, NR uplink and LTE uplink
Simultaneous transmission of NR uplink, LTE sidelink and LTE uplink
A case of performing simultaneous transmission using four links
Simultaneous transmission of NR uplink, NR sidelink, LTE uplink and LTE sidelink Which scenario among the above scenarios can be supported may be determined according to the capability of the NR V2X UE.

An NR V2X UE capable of transmission only through a single link may require a rule for which link should be used for transmission among the four links described above. In addition, since an NR V2X UE capable of simultaneous transmission through two or more links has a limit on the transmission power thereof, it may have to properly distribute and allocate transmission power so that the transmission power does not exceed its maximum transmission power.

Embodiments of the present specification are proposed to support the above-described scenarios, and aim to provide a method and apparatus for an NR V2X UE to allocate and distribute transmission power.

FIGS. 1A, 1B, 1C and 1D are an example of a system for describing an embodiment of the disclosure.

FIG. 1A illustrates a case where all V2X UEs (UE-1 and UE-2) are located within the coverage of the base station.

All V2X UEs may receive data and control information through a downlink (DL) from the base station 103 or transmit data and control information through an uplink (UL) to the base station 103. Here, the data and control information may be data and control information for V2X communication. Or, the data and control information may be data and control information for regular cellular communication. In addition, the V2X UEs may transmit and receive data and control information for V2X communication through a sidelink (SL).

Figure 1B:
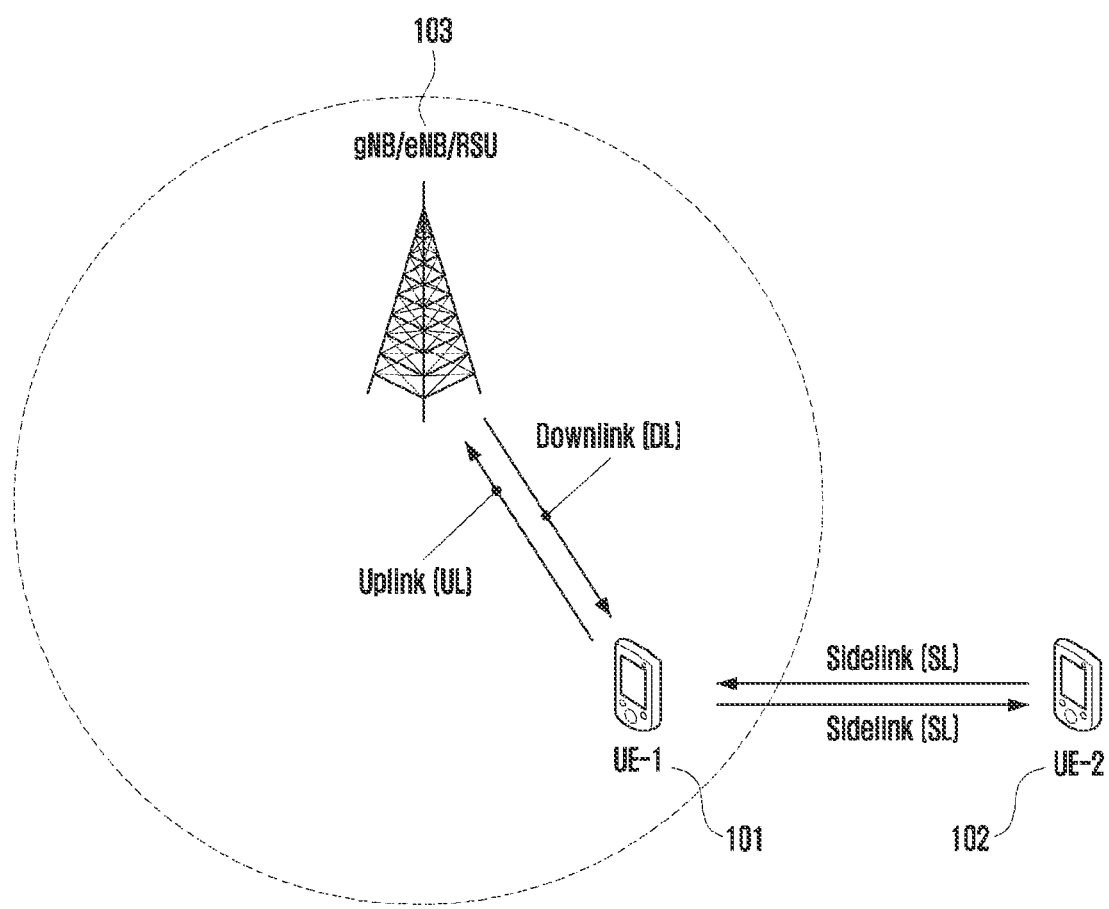
FIG. 1B is another example of a system for describing an embodiment of the disclosure.

FIG. 1B illustrates a case where UE-1 101 among V2X UEs is located within the coverage of the base station 103 and UE-2 102 is located outside the coverage of the base station 103. The illustration of FIG. 1B may be referred to as an example for partial coverage.

UE-1 101 located within the coverage of the base station 103 may receive data and control information through a downlink (DL) from the base station 103, or may transmit data and control information to the base station 103 through an uplink (UL).

UE-2 102 located outside the coverage of the base station 103 cannot receive data and control information from the base station 103 through a downlink, and cannot transmit data and control information to the base station 103 through an uplink.

UE-2 102 may transmit and receive data and control information for V2X communication through a sidelink to and from UE-1 101.

Figure 1C:
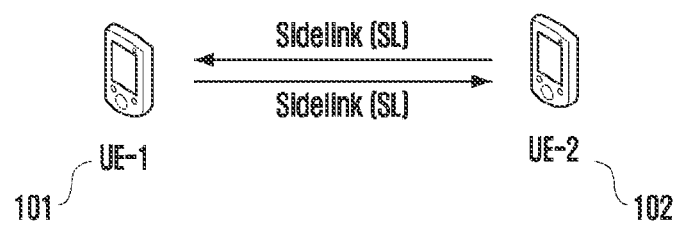
FIG. 1C is another example of a system for describing an embodiment of the disclosure.

FIG. 1C illustrates a case where all V2X UEs are located outside the coverage of the base station.

Hence, UE-1 101 and UE-2 102 cannot receive data and control information from the base station through a downlink, and cannot transmit data and control information to the base station through an uplink.

UE-1 101 and UE-2 102 may transmit and receive data and control information for V2X communication through a sidelink.

Figure 1D:
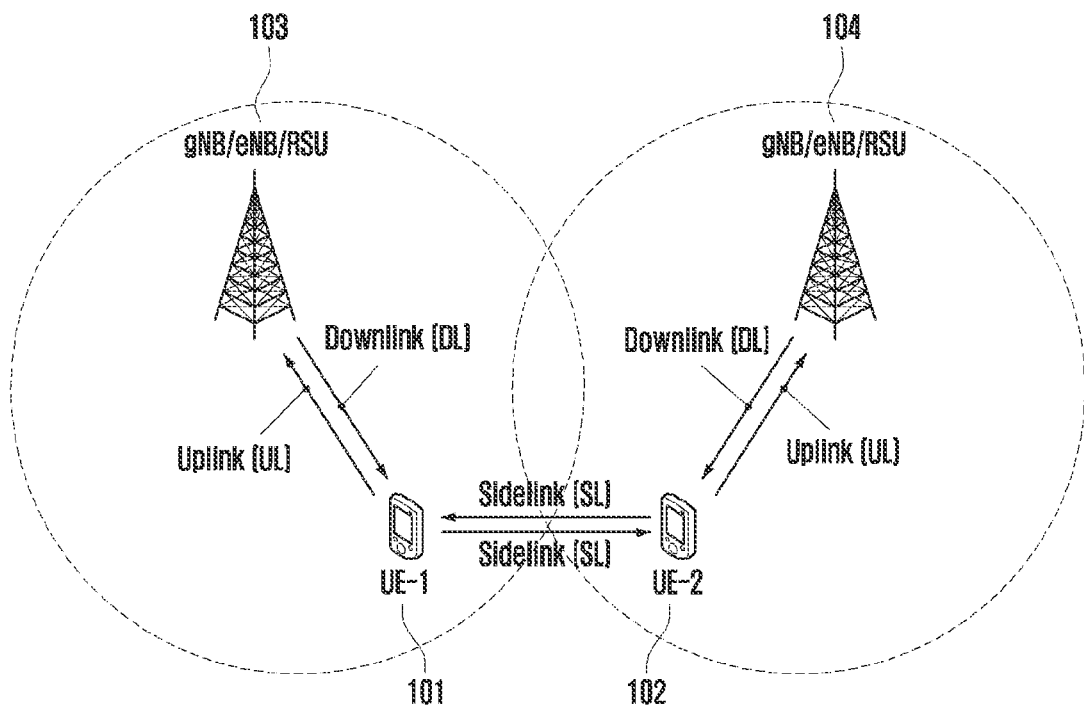

FIG. 1D illustrates a scenario where UEs located in different cells perform V2X communication. Specifically, FIG. 1D illustrates a case where a V2X transmitting UE and a V2X receiving UE are connected to different base stations (RRC connected state) or are camping thereon (RRC connection released state, that is, RRC idle state). Here, UE-1 101 may be a V2X transmitting UE and UE-2 102 may be a V2X receiving UE. Alternatively, UE-1 101 may be a V2X receiving UE, and UE-2 102 may be a V2X transmitting UE. UE-1 101 may receive a V2X-specific system information block (SIB) from a base station 103 to which it is connected (or, on which it is camping), UE-2 102 may receive a V2X-specific SIB from another base station 104 to which it is connected (or, on which it is camping). Here, the information of the V2X-specific SIB received by UE-1 101 and the information of the V2X-specific SIB received by UE-2 102 may be different from each other. Hence, in order for UEs located in different cells to perform V2X communication, it is necessary to standardize information.

For convenience of description, FIGS. 1A, 1B, 1C and 1D illustrate, but not limited to, a V2X system composed of two UEs (UE-1 and UE-2). In addition, the uplink and downlink between the base station and the V2X UE may be referred to as a Uu interface, and the sidelink between the V2X UEs may be referred to as a PC5 interface. Hence, these may be used interchangeably in the disclosure.

Meanwhile, in the disclosure, the UE 101 or 102 may refer to a vehicle supporting vehicle-to-vehicle (V2V) communication, a vehicle or pedestrian handset (i.e., smartphone) supporting vehicle-to-pedestrian (V2P) communication, a vehicle supporting vehicle-to-network (V2N) communication, or a vehicle supporting vehicle-to-infrastructure (V2I) communication. Also, in the disclosure, the UE may refer to a road side unit (RSU) equipped with a UE function, an RSU equipped with a base station function, or an RSU equipped with a part of a base station function and a part of a UE function.

In addition, the disclosure defines in advance that the base station 103 may be a base station supporting both V2X communication and regular cellular communication or a base station supporting only V2X communication. And, in this case, the base station may mean a 5G base station (gNB), a 4G base station (eNB), or a road site unit (RSU). Hence, unless otherwise specified in the disclosure, the base station and the RSU may be used interchangeably since they are used as the same concept.

Figure 2A:
FIG. 2A is an example of a V2X communication method performed through a sidelink.
Figure 2B:
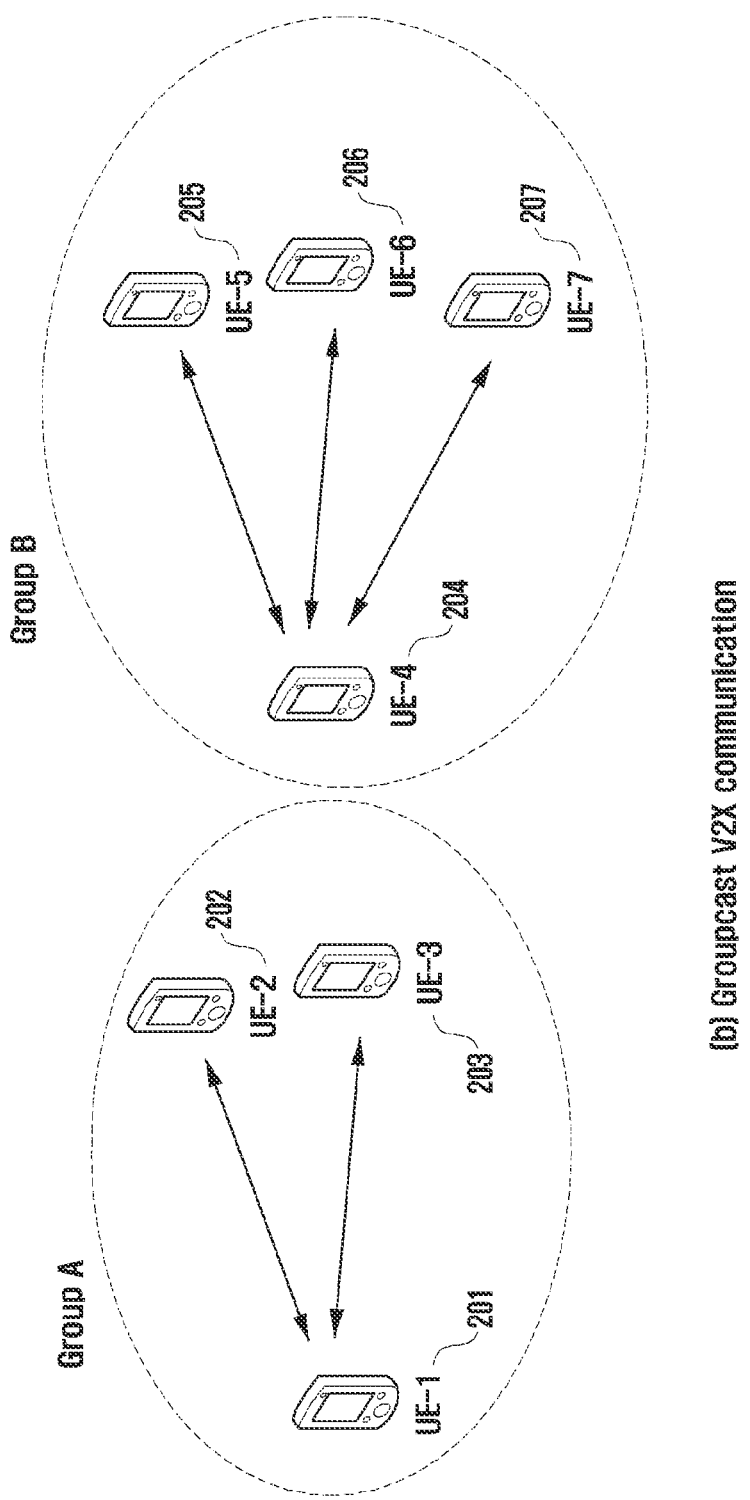
FIG. 2B is another example of a V2X communication method performed through a sidelink.

FIGS. 2A and 2B are examples of a V2X communication method performed through a sidelink.

As shown in FIG. 2A, the TX UE and the RX UE may perform communication in a one-to-one way, which may be referred to as unicast communication.

As shown in FIG. 2B, the TX UE and the RX UEs may perform communication in a one-to-many way, which may be referred to as groupcast or multicast.

FIG. 2B depicts a situation where UE-1 201, UE-2 202, and UE-3 203 form one group (group A) to perform groupcast communication, and UE-4 204, UE-5 205, UE-6 206, and UE-7 207 form another group (group B) to perform groupcast communication. Each UE performs groupcast communication only within the group to which it belongs, and communication between different groups is not performed. FIG. 2B illustrates formation of, but not limited to, two groups.

Meanwhile, although not shown in FIGS. 2A and 2B, V2X UEs can perform broadcast communication. Broadcast communication means a case where all V2X UEs receive data and control information transmitted through a sidelink by a V2X transmitting UE. For example, assuming in FIG. 2B that UE-1 is a transmitting UE for broadcasting, all UEs (UE-2, UE-3, UE-4, UE-5, UE-6, UE-7) may receive data and control information transmitted by UE-1 201.

Figure 3:
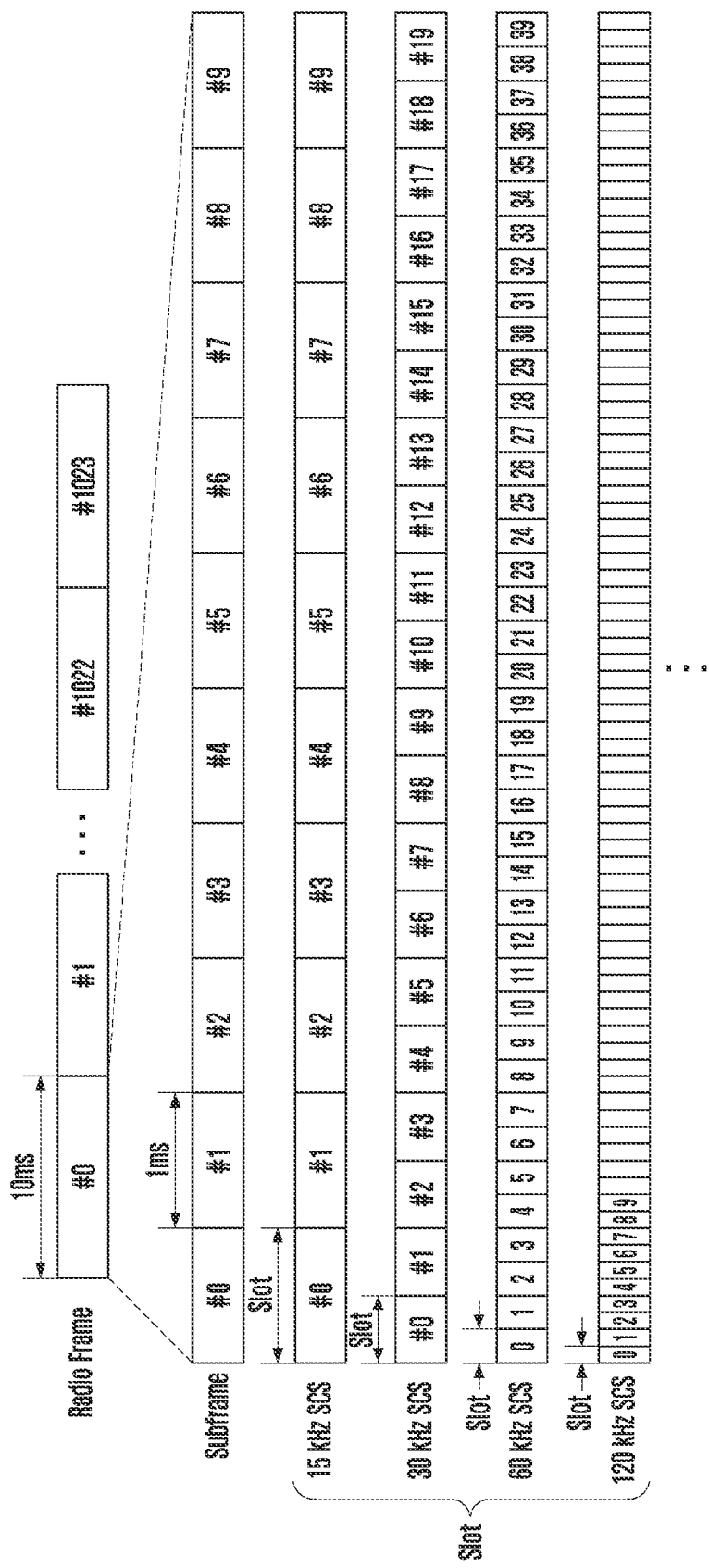
FIG. 3 is an example of a frame structure for V2X communication according to an embodiment of the disclosure.

FIG. 3 is an example of the frame structure for V2X communication according to an embodiment of the disclosure.

FIG. 3 illustrates, but not limited to, that the system operates 1024 radio frames. For example, a specific system may operate less than or more than 1024 radio frames, and the number of radio frames operated by the system may be configured to the UE by the base station with a master information block (MIB) transmitted through the physical broadcast channel (PBCH), or may be a fixed value agreed in advance with the UE. In FIG. 3, the radio frame number and the system frame number may be treated the same. That is, radio frame number '0' may correspond to system frame number '0', and radio frame number '1' may correspond to system frame number '1'. One radio frame has a length of 10 ms on the time axis and may be composed of 10 subframes. That is, one subframe may have a length of 1 ms on the time axis. The subcarrier spacing that can be used in NR V2X communication may be represented as 15 kHz×$2^n$, where n is an integer with values of 0, 1, 2, 3, .... As shown in FIG. 3, in NR V2X, the number of slots constituting one subframe is $2^n$, which may vary depending on the subcarrier spacing. For example, when using a 15 kHz subcarrier spacing, one subframe may be composed of one slot (n=0). In addition, when using 30 kHz, 60 kHz, and 120 kHz for the subcarrier spacing, one subframe may be composed of 2 slots (n=1), 4 slots (n=2), and 8 slots (n=3), respectively.

Although not shown in FIG. 3, one slot may be composed of 14 orthogonal frequency division multiplexing (OFDM) symbols or discrete Fourier transform-spread-OFDM (DFT-S-OFDM) symbols regardless of the subcarrier spacing. The above contents may be summarized as in Table 1 (physical layer parameters according to subcarrier spacing) below.

TABLE 1

| subcarrier spacing | 15 kHz | 30 kHz | 60 kHz | 120 kHz |
|---|---|---|---|---|
| 1 radio frame length | 10 ms (10 subframes) | | | |
| 1 subframe length | 1 ms | | | |
| Number of slots per subframe | 1 | 2 | 4 | 18 |
| Number of symbols per slot | 14 | | | |
| Number of symbols per subframe | 14 | 28 | 56 | 112 |

Figure 4:
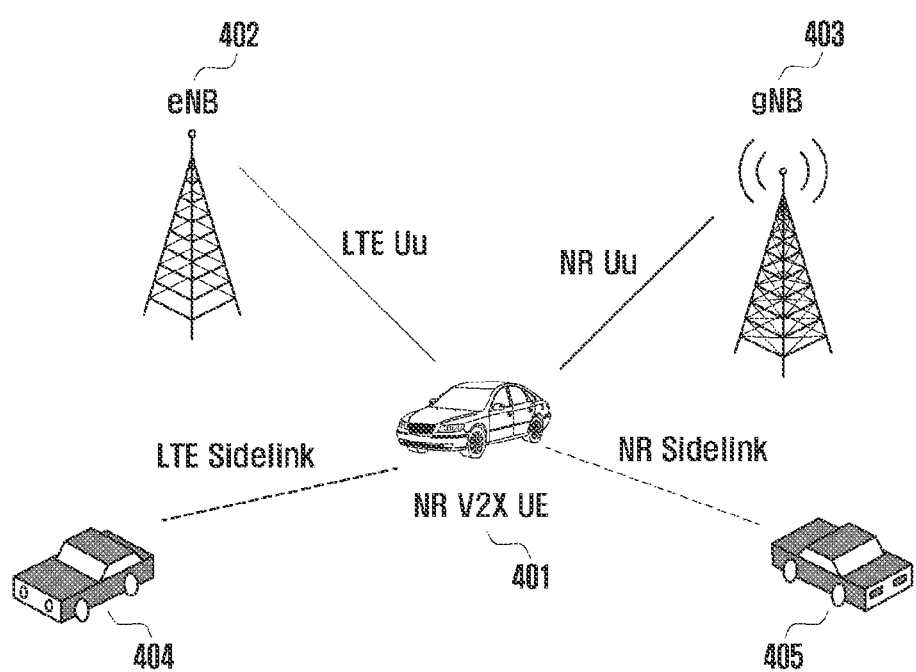
FIG. 4 is a diagram illustrating an example of links through which an NR V2X UE can perform V2X communication.

FIG. 4 illustrates an example of links through which an NR V2X UE can perform V2X communication.

Specifically, V2X communication may be performed through at least one of the following links.

The link between one NR V2X UE 401 and another NR V2X UE 405 may be called an NR sidelink. The NR V2X UE 401 may transmit sidelink control information and data information for NR V2X communication to another NR V2X UE 405 through the NR sidelink. In addition, the NR V2X UE 401 may receive sidelink control information and data information for NR V2X communication from another NR V2X UE 405 through the NR sidelink.

The link between the NR V2X UE 401 and an LTE V2X UE 404 may be called an LTE sidelink. Here, the NR V2X UE 401 may be assumed to have a capability to support LTE V2X communication. This NR V2X UE 401 may transmit and receive control information and data information for LTE V2X communication through the LTE sidelink.

The downlink or uplink between the NR V2X UE 401 and the NR base station 403 (gNB) may be named NR Uu. The NR V2X UE 401 may receive control information and data information related to NR sidelink transmission and reception from the NR base station 403 (gNB) through the NR Uu. In addition, the NR V2X UE 401 may transmit NR sidelink control information and data information received from another NR V2X UE 405 to the gNB 403 through the NR Uu.

The NR V2X UE 401 may receive control information and data information related to LTE sidelink transmission and reception from the NR base station 403 (gNB) through the NR Uu. In addition, the NR V2X UE 401 may transmit LTE sidelink control information and data information received from the LTE V2X UE 404 to the gNB 403 through the NR Uu. Here, the NR V2X UE 401 may be assumed to have a capability to support LTE V2X communication.

The downlink or uplink between the NR V2X UE 401 and the LTE base station 402 (eNB) may be named LTE Uu. The NR V2X UE 401 may receive control information and data information related to NR sidelink transmission and reception from LTE base station 402 (eNB) through the LTE Uu. In addition, the NR V2X UE 401 may transmit NR sidelink control information and data information received from another NR V2X UE 405 to the eNB 402 through the LTE Uu. Here, the NR V2X UE 401 may be assumed to have a capability to support the LTE Uu.

The NR V2X UE 401 may receive control information and data information related to LTE sidelink transmission and reception from the eNB 402 through the LTE Uu. In addition, the NR V2X UE 401 may transmit LTE sidelink control information and data information received from the LTE V2X UE 404 to the eNB 402 through the LTE Uu. Here, it may be assumed that the NR V2X UE 401 has a capability to support LTE V2X communication and also has a capability to support the LTE Uu.

A specific NR V2X UE 401 may perform V2X communication and cellular communication by using one or more links shown in FIG. 3 at the same time.

In particular, when the NR V2X UE performs communication using two or more links at the same time, the following scenarios may exist.

Scenario 1) a case of transmitting using two links at the same time

NR Uu+NR Sidelink: the NR V2X UE 401 may transmit NR V2X control information and data information to the gNB 403 through the NR Uu (or, may transmit uplink control information and data information for NR cellular communication to the gNB 403) and, at the same time, may transmit control information and data information for NR V2X communication to another NR V2X UE 405 through the NR sidelink.

NR Uu+LTE Sidelink: the NR V2X UE 401 may transmit NR V2X control information and data information to the gNB 403 through the NR Uu (or, may transmit uplink control information and data information for NR cellular communication to the gNB 403) and, at the same time, may transmit control information and data information for LTE V2X communication to the LTE V2X UE 404 through the LTE sidelink.

NR Uu+LTE Uu: the NR V2X UE 401 may transmit NR V2X control information and data information to the gNB 403 through the NR Uu (or, may transmit uplink control information and data information for NR cellular communication) and, at the same time, may transmit LTE V2X control information and data information to the eNB 402 through the LTE Uu (or, may transmit uplink control information and data information for LTE cellular communication to the eNB 402). In this scenario, since there is no transmission of NR V2X control information and data information through the NR sidelink, it cannot be viewed as an operation of the NR V2X UE. As the disclosure is to identify the operation of the NR V2X UE, this scenario can be excluded from the disclosure.

NR Sidelink+LTE Uu: the NR V2X UE 401 may transmit control information and data information for NR V2X communication to another NR V2X UE 405 through the NR sidelink and, at the same time, may transmit NR V2X control information and data information to the gNB 403 through the NR Uu (or, may transmit uplink control information and data information for NR cellular communication to the gNB 403).

NR Sidelink+LTE Sidelink: the NR V2X UE 401 may transmit control information and data information for NR V2X communication to another NR V2X UE 405 through the NR sidelink and, at the same time, may transmit control information and data information for LTE V2X communication to the LTE V2X UE 404 through the LTE sidelink.

LTE Sidelink+LTE Uu: the NR V2X UE 401 may transmit control information and data information for LTE V2X communication to the LTE V2X UE 404 through the LTE sidelink and, at the same time, may transmit LTE V2X control information and data information to the eNB 402 through the LTE Uu (or, may transmit uplink control information and data information for LTE cellular communication to the eNB 402). In this scenario, since there is no transmission of control information and data information through the NR Uu or NR sidelink, it cannot be viewed as an operation of an NR V2X UE (i.e., it can be viewed as an operation of an LTE V2X UE). As the disclosure is to identify the operation of the NR V2X UE, this scenario can be excluded from the disclosure.

Scenario 2) a case of transmitting using three links at the same time

NR Sidelink+LTE Sidelink+NR Uu: the NR V2X UE 401 may transmit control information and data information for NR V2X communication and LTE V2X communication respectively through the NR sidelink and the LTE sidelink and, at the same time, may transmit NR V2X control information or data information to the gNB 403 through the NR Uu (or, may transmit uplink control information and data information for NR cellular communication to the gNB 403).

NR Uu+NR Sidelink+LTE Uu: the NR V2X UE 401 may transmit NR V2X control information and data information to the gNB 403 through the NR Uu (or, transmit uplink control information and data information for NR cellular communication to the gNB 403), and may transmit control information and data information for NR V2X communication to another NR V2X UE 405 through the NR sidelink. At the same time, the NR V2X UE 401 may transmit LTE V2X control information and data information to the eNB 402 through the LTE Uu (or, may transmit uplink control information and data information for LTE cellular communication to the eNB 402).

NR Uu+LTE Sidelink+LTE Uu: the NR V2X UE 401 may transmit NR V2X control information or data information to the gNB 403 through the NR Uu (or, transmit uplink control information and data information for NR cellular communication to the gNB 403), and may transmit control information and data information for LTE V2X communication to the LTE V2X UE 404 through the LTE sidelink. At the same time, the NR V2X UE 401 may transmit LTE V2X control information or data information to the eNB 402 through the LTE Uu (or, may transmit uplink control information and data information for LTE cellular communication to the eNB 402).

NR Sidelink+LTE Sidelink+LTE Uu: the NR V2X UE 401 may transmit control information and data information for NR V2X communication and LTE V2X communication respectively through the NR sidelink and the LTE sidelink, and, at the same time, may transmit LTE V2X control information or data information to the eNB 402 through the LTE Uu (or, may transmit uplink control information and data information for LTE cellular communication to the eNB 402).

Scenario 3) a case of transmitting using four links at the same time

NR Uu+NR Sidelink+LTE Uu+LTE Sidelink: the NR V2X UE 401 may transmit NR V2X control information or data information to the gNB 403 through the NR Uu (or, transmit uplink control information and data information for NR cellular communication to the gNB 403), and may transmit control information and data information for NR V2X communication to another NR V2X UE 405 through the NR sidelink. At the same time, the NR V2X UE 401 may transmit LTE V2X control information or data information to the eNB 402 through the LTE Uu (or, transmit uplink control information and data information for LTE cellular communication to the eNB 402), and may transmit LTE V2X control information or data information to the LTE V2X UE 404 through the LTE sidelink.

Although not mentioned in the above examples, carrier aggregation (CA) technology may be combined with each of the above scenarios. For example, the NR V2X UE 401 may transmit NR control information and data information through one or more NR Uu links by use of NR Uu CA. In addition, the NR V2X UE 401 may transmit control information and data information for NR V2X through one or more NR sidelinks by use of NR sidelink CA. Similarly, the NR V2X UE 401 may transmit LTE control information and data information through one or more LTE Uu links by use of LTE Uu CA. Also, the NR V2X UE may transmit control information and data information for LTE V2X through one or more LTE sidelinks by use of LTE sidelink CA.

The NR V2X UE 401 may have to perform transmission on a single link or support at least one of the scenarios exemplified above according to its capabilities. Hence, the NR V2X UE 401 capable of only single link transmission may have to allocate transmission power only to a specific link. In addition, the NR V2X UE capable of simultaneous transmission using two or more links may have to allocate and distribute transmission power to individual links. Various methods may exist for allocating and distributing transmission power, and one of the methods mentioned in FIG. 5A, FIG. 5B, FIG. 6A, and FIG. 6B may be applied.

Figure 5A:
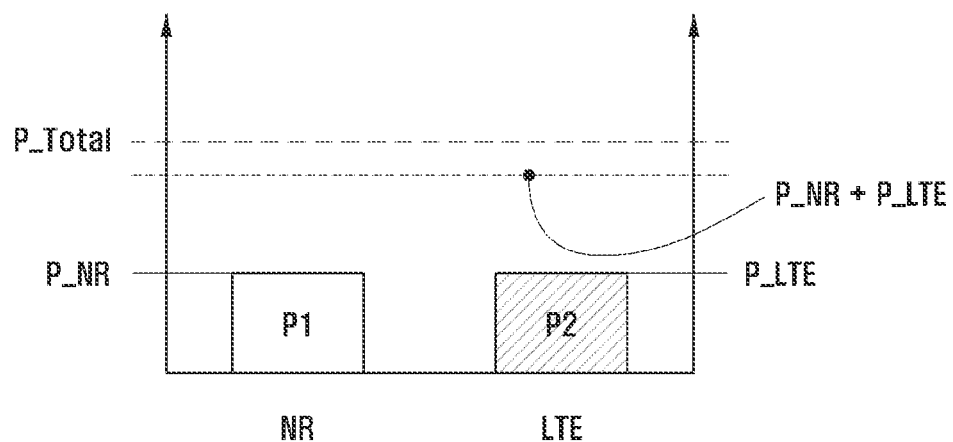
FIG. 5A is an example of transmission power distribution of a V2X UE according to an embodiment of the disclosure.
Figure 5B:
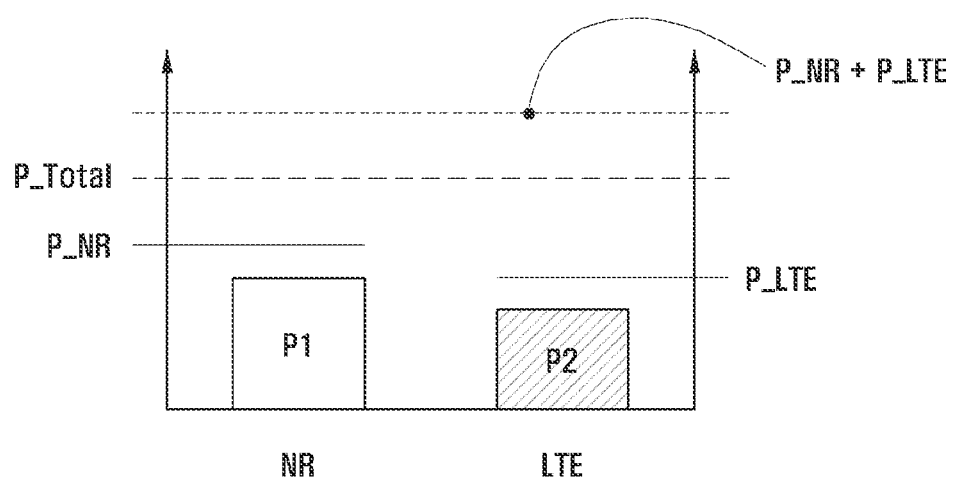
FIG. 5B is another example of transmission power distribution of a V2X UE according to an embodiment of the disclosure.

FIGS. 5A and 5B are examples of distributing transmission power of a V2X UE according to an embodiment of the disclosure.

In FIGS. 5A and 5B, P_NR may indicate the maximum transmission power usable for NR transmission, and P_LTE may indicate the maximum transmission power usable for LTE transmission. Also, P1 may indicate the transmission power actually used for NR transmission, and P2 may indicate the transmission power actually used for LTE transmission. Here, since the actually used transmission power cannot be greater than the allowed maximum transmission power, P1≤P_NR and P2≤P_LTE should be satisfied in FIGS. 5A and 5B. In addition, P_Total shown in FIGS. 5A and 5B is the maximum transmission power value allowed for simultaneous transmission of the NR link and the LTE link. Here, P_NR, P_LTE, P1, P2, and P_Total have linear values, not in units of dB or dBm.

FIG. 5A illustrates a case where the sum of P_NR and P_LTE is less than P_Total, and FIG. 5B illustrates a case where the sum of P_NR and P_LTE is greater than P_Total. A case where the sum of P_NR and P_LTE is equal to P_Total is not illustrated in FIGS. 5A and 5B, but it may be included in the category of FIG. 5A. In addition, FIG. 5A shows that P_NR=P_LTE, and FIG. 5B shows that P_NR>P_LTE. However, this is an example, and the methods described in this disclosure may be applied even in a scenario of P_NR<P_LTE.

In FIGS. 5A and 5B, NR transmission may mean simultaneous transmission of the NR Uu and NR sidelink, or transmission through one link of the NR Uu and NR sidelink. In addition, LTE transmission may mean simultaneous transmission of the LTE Uu and LTE sidelink, or transmission through one link of the LTE Uu and LTE sidelink.

The NR V2X UE may be configured with information about P_NR_dBm, P_LTE_dBm, and P_Total_dBm through UE-specific RRC parameters after completing the RRC connection with the base station (RRC connected mode) (here, P_NR_dBm=10 log 10(P_NR), P_LTE_dBm=10 log 10(P_LTE), and P_Total_dBm=10 log 10(P_Total)). For example, when the V2X UE establishes an RRC connection with the NR base station (gNB), the V2X UE may receive corresponding information from the gNB. When the V2X UE establishes an RRC connection with the LTE base station (eNB), the V2X UE may receive information about P_NR_dBm, P_LTE_dBm, and P_Total_dBm from the eNB. As another example, when the V2X UE establishes an RRC connection with both the gNB and the eNB, it may receive information about P_NR_dBm, P_LTE_dBm, and P_Total_dBm from the master node. More specifically, the above case may be viewed as a dual connectivity (DC) scenario, and in an LTE-NR DC environment where the eNB serves as a master node, the eNB may configure the corresponding information as RRC parameters to the NR V2X UE. Also, in an NR-LTE DC environment where the gNB serves as a master node, the gNB may configure the corresponding information as RRC parameters to the NR V2X UE.

On the other hand, P_NR_dBm, P_LTE_dBm, and P_Total_dBm may be configured from the base station (gNB or eNB) on which the V2X UE camps through system information (system information block, SIB) other than UE-specific RRC configuration. Here, the V2X UE may be in a state (i.e., RRC idle state) where RRC connection setup is not performed with the base station on which it camps.

From the viewpoint of the base station, when there is an interface between the gNB and the eNB, the gNB and the eNB may negotiate for setting P_NR and P_LTE values through the interface. In this case, the sum of P_NR and P_LTE may be set to be less than or equal to P_Total. However, when there is no interface between the gNB and the eNB, the gNB and the eNB may independently set the P_NR and P_LTE values without negotiation on the P_NR, P_LTE and P_Total values. Hence, a case may arise at a specific moment in which the sum of P_NR and P_LTE is greater than P_Total (P_NR+P_LTE>P_Total).

On the other hand, from the viewpoint of the NR V2X UE, when there is an interface between the NR modem and the LTE modem, the NR modem and the LTE modem may exchange information about P1 and P2. In this case, even if the base station performs configuration so that P_NR+P_LTE>P_Total in the above example, the NR V2X UE may adjust the transmission power value so that the sum of P1 and P2 is less than or equal to P_Total (P1+P2≤P_Total) through the exchange of information on the transmission power value between the NR modem and the LTE modem. A UE having this capability can be identified as a UE capable of dynamic power allocation between NR and LTE.

On the contrary, when there is no interface between the NR modem and the LTE modem, information on P1 and P2 cannot be exchanged. In this case, if the base station performs configuration so that P_NR+P_LTE>P_Total in the above example, transmission may have to be performed using only one of the NR link and the LTE link. A UE having this capability can be identified as a UE capable of single uplink operation (SUO) between NR and LTE.

Next, a detailed description will be given of the transmission power distribution operation according to the capability of the LIE in various scenario environments exemplified above.

An NR V2X UE that does not have the capability to perform simultaneous transmission through the NR link and the LTE link cannot perform simultaneous transmission through the NR link and the LTE link. Hence, such a UE can transmit using only one of the NR and LTE links (SUO). In this case, one of the following methods may be applied to which link should be used for transmission.

The NR V2X UE may perform transmission using only one link according to a preset rule. For example, the NR V2X UE may perform transmission only through the link of the base station to which it has established an RRC connection. That is, if the NR V2X UE has established an RRC connection with the gNB, it may set the transmission power to P1 and transmit over the NR link. If the NR V2X UE has established an RRC connection with the eNB, it may set the transmission power to P2 and transmit over the LTE link. If the NR V2X UE has established an RRC connection with both the gNB and the eNB, it can transmit only through the link connected to the master node. For example, when the gNB is the master node, the NR V2X UE may set the transmission power to P1 and transmit over the NR link. When the eNB is the master node, the NR V2X UE may set the transmission power to P2 and transmit over the LTE link.

As another example, unlike the above example, according to the priority of the physical channel transmitted through each link, transmission over a link through which a channel with a lower priority is transmitted may be abandoned, and transmission may be performed only over a link through which a channel with a higher priority is transmitted. For instance, the control channel may have a higher priority than the data channel. That is, when the control channel is transmitted through the NR link and the data channel is transmitted through the LTE link, transmission can be performed only over the NR link through which the control channel is transmitted. On the other hand, there may be a case in which the control channel is transmitted over both the NR link and the LTE link. In this case, the priority set in advance for individual channels may be followed. A specific example of this will be described in detail later.

As another example, the NR V2X UE may perform transmission through only one link according to the priority provided by the base station through the RRC configuration. More specifically, the gNB or eNB may configure, through RRC parameters, the NR V2X UE with priority values according to the type of data transmitted over the NR link and the LTE link. Based on the configured priority values, the NR V2X UE may abandon transmission over a link through which data of a low priority is transmitted, and may perform transmission only over a link through which data of a high priority should be transmitted.

The NR V2X UE capable of performing simultaneous transmission over the NR link and the LTE link may perform the following operations according to the settings of the base station.

When $P\_NR+P\_LTE \leq P\_Total$ is set by the base station

The NR V2X UE may perform simultaneous transmission over the NR link and the LTE link by setting transmission powers of the NR link and the LTE link to P1 and P2, respectively. Here, the base station may perform configuration so that $P1 \leq P\_NR$ and $P2 \leq P\_LTE$ are satisfied.

When $P\_NR+P\_LTE > P\_Total$ is set by the base station

The NR V2X UE with a dynamic power allocation capability may adjust the transmission power values so that $P\_NR+P\_LTE \leq P\_Total$ is satisfied, and may apply one of the following methods.

The NR V2X UE may adjust both the transmission power values of the NR link and the LTE link. More specifically, the transmission power value of the NR link may be reduced by $w1*P\_NR$ and the transmission power value of the LTE link may be reduced by $w2*P\_LTE$. Here, $w1*P\_NR+w2*P\_LTE$ P_Total should be satisfied. w1 and w2 mean scaling factors for the NR link and the LTE link, respectively, and may have a value between 0 and 1. The NR V2X UE may adjust the transmission power value by determining w1 and w2 values satisfying the conditions $0 \leq w1 \leq 1$ and $0 \leq w2 \leq 1$. As another example, the NR V2X UE may adjust the transmission power value by determining w1 and w2 values satisfying the condition $0 \leq w1+w2 \leq 1$ where w1+w2 has a value between 0 and 1.

The NR V2X UE may reduce the transmission power value for the NR link without changing the transmission power value for the LTE link. This may mean a variation of the above example, where w2 is always set to 1. Here, w1 may have a value between 0 and 1. This scenario may be applied, but not limited to, when the NR V2X UE has established an RRC connection with the eNB (no RRC connection establishment with gNB) or when the eNB is configured as the master node (RRC connection establishment with both gNB and eNB).

As another variation of the above example, w1 is always set to 1 and w2 may have a value between 0 and 1. This scenario may be applied, but not limited to, when the NR V2X UE has established an RRC connection with the gNB (no RRC connection establishment with eNB) or when the gNB is configured as the master node (RRC connection establishment with both gNB and eNB).

As another example, according to the priority of a physical channel transmitted through each link, a case where a lower priority channel has a more reduced transmission power value compared to a higher priority channel may be considered. For example, assuming that the control channel has a higher priority than the data channel, the scaling factor for the control channel may be defined α and the scaling factor for the data channel may be defined as β. Here, α and β may each have a value between 0 and 1, and the α value may always be less than the P value. Hence, when the control channel is transmitted through the NR link and the data channel is transmitted through the LTE link, the transmission power values may be adjusted so that $\alpha*P\_NR+\beta*P\_LTE \leq P\_Total$ is satisfied. Conversely, when the control channel is transmitted through the LTE link and the data channel is transmitted through the NR link, the transmission power values may be adjusted so that $\beta*P\_NR+*P\_LTE \leq P\_Total$ is satisfied. On the other hand, there may be a case in which both the NR link and the LTE link transmit a control channel or both transmit a data channel. In this case, the priority set in advance for each channel may be followed. Detailed examples of this will be described later.

Meanwhile, for the NR V2X UE that does not have a dynamic power allocation capability, as information on transmission power allocation cannot be exchanged between the NR modem and the LTE modem of the UE, the transmission power values cannot be adjusted to satisfy $P\_NR+P\_LTE \leq P\_Total$. Hence, one of the aforementioned SUO methods may be applied to set the transmission power value.

In the above examples, methods for distributing the transmission power to the NR link and the LTE link have been described. However, the NR link may be composed of the NR Uu and NR sidelink, and the LTE link may be composed of the LTE Uu and LTE sidelink. Hence, it may be necessary to redistribute the transmission power, which has been distributed to the NR link and the LTE link, to the Uu and sidelink of each of the NR link and the LTE link. One of the following methods may be considered as a method for transmission power redistribution.

[Method for Distributing Transmission Power to LTE Uu and LTE Sidelink]

Transmission power distributed to the LTE link may be redistributed to the LTE Uu and LTE sidelink by applying at least one of the following methods.

Method 1: Distribution of transmission power according to predefined priority

Transmission power can be distributed to the LTE Uu and LTE sidelink according to predefined priorities. In this case, the priority may be determined according to the type of the physical layer channel transmitted through the Uu and the sidelink. Also, at this time, it may be assumed that transmissions through the Uu and the sidelink are performed in the same cell or in the same component carrier (CC). For example, when the physical layer random access channel is transmitted through the Uu and, at the same time, sidelink control information and data information are transmitted through the sidelink, the UE may abandon sidelink transmission and perform Uu link transmission (that is, the transmission power distributed to the LTE link is distributed so that the transmission power of the sidelink is set to 0 and the remaining transmission power is used for Uu transmission). Conversely, when a physical layer channel other than the random access channel (e.g., physical layer uplink data channel or physical layer uplink control channel) is transmitted through the Uu and, at the same time, sidelink control information and data information are transmitted through the sidelink, the UE may abandon Uu transmission and perform sidelink transmission (that is, the transmission power distributed to the LTE link is distributed so that the transmission power of the Uu is set to 0 and the remaining transmission power is used for sidelink transmission).

As another example, a case in which CA is applied to the sidelink may be considered. That is, it may mean a case in which sidelink control information and data are transmitted through two or more carriers and Uu transmission is performed at the same time. In this case, sidelink transmission may be not performed on a carrier through which Uu transmission is performed. For example, it may mean a case in which Uu transmission is performed on component carrier 1 (CC #1) and sidelink transmission is performed on component carrier 2 (CC #2) and component carrier 3 (CC #3). In this case, while maintaining the transmission power used for Uu transmission, the sidelink transmission power may be reduced so that the sum of the transmission power used for sidelink transmission and the transmission power used for Uu transmission is less than or equal to the maximum transmission power (Pcmax) of the UE. On the other hand, when sidelink transmission is performed on a carrier through which Uu transmission is performed, as in the case described above where simultaneous transmission of the Uu and sidelink is performed in the same cell, the transmission power may be allocated to either the Uu or the sidelink based on the preset priority according to the physical layer.

Method 2: Distribution of transmission power according to configured priority

The eNB may configure the threshold of priority to the UE through system information (SIB) or UE-specific RRC configuration. And, the UE may receive a priority value of the sidelink to be transmitted by it from a higher layer (e.g., application layer) of the UE. Here, it may be assumed that Uu and sidelink transmissions are performed in the same cell or in the same component carrier. The UE may compare the threshold value for the priority configured by the eNB with the priority value of the sidelink to be transmitted by the UE. When the priority value of the sidelink is smaller than the threshold value configured by the eNB (the smaller value takes precedence), the UE may abandon Uu transmission and perform sidelink transmission (that is, the transmission power distributed to the LTE link is distributed so that the transmission power of the Uu is set to 0 and the remaining transmission power is used for sidelink transmission). Conversely, when the priority value of the sidelink is greater than the threshold value configured by the eNB, the UE may abandon sidelink transmission and perform Uu transmission (that is, the transmission power distributed to the LTE link is distributed so that the transmission power of the sidelink is set to 0 and the remaining transmission power is used for Uu transmission).

As another example, a case in which CA is applied to the sidelink may be considered. That is, it may mean a case in which sidelink transmission is performed through two or more carriers and Uu transmission is performed at the same time. In this case, sidelink transmission may be not performed on a carrier through which Uu transmission is performed. For example, it may mean a case in which Uu transmission is performed on component carrier 1 (CC #1) and sidelink transmission is performed on component carrier 2 (CC #2) and component carrier 3 (CC #3). In such a case, when the priority value of the sidelink is smaller than the threshold value configured by the eNB (the smaller value takes precedence), the UE may adjust the transmission power used for Uu transmission while maintaining the transmission power used for sidelink transmission. Here, the Uu transmission power may be reduced so that the sum of the transmission power used for sidelink transmission and the transmission power used for Uu transmission is less than or equal to the maximum transmission power (Pcmax) of the UE. Conversely, when the priority value of the sidelink is greater than the threshold value configured by the eNB, the UE may adjust the transmission power used for sidelink transmission while maintaining the transmission power used for Uu transmission. Here, the sidelink transmission power may be reduced so that the sum of the transmission power used for Uu transmission and the transmission power used for sidelink transmission is less than or equal to the maximum transmission power (Pcmax) of the UE. On the other hand, when sidelink transmission is performed on a carrier through which Uu transmission is performed, a transmission power distribution method may be applied as in the case described above where Uu and sidelink transmissions are performed in the same cell or the same component carrier.

[Method for Distributing Transmission Power to NR Uu and NR Sidelink]

Transmission power distributed to the NR link may be redistributed to the NR Uu and NR sidelink by applying at least one of the following methods.

Method 1: Distribution of transmission power according to predefined priority

Transmission power can be distributed to the NR Uu and NR sidelink according to predefined priorities. More specifically, it is possible to adjust the transmission power for a channel with a low priority while maintaining the transmission power for a channel with a high priority. Here, the transmission power of the low-priority channel may be reduced so that the sum of the transmission power used for Uu transmission and the transmission power used for sidelink transmission is less than or equal to the maximum transmission power (Pcmax) of the UE. There may be various methods for defining the priority, and at least one of the following methods may be used.

When Uu and sidelink transmissions are performed in the same cell or the same component carrier, Uu transmission may always have a higher priority than sidelink transmission. In this case, the V2X UE may set the sidelink transmission power to 0 (abandoning or dropping sidelink transmission) and perform Uu transmission (that is, the transmission power distributed to the NR link is distributed so that the transmission power of the sidelink is set to 0 and the remaining transmission power is used for Uu transmission). The above example may be equally applied to a case in which Uu and sidelink transmissions are performed in different cells or different component carriers.

The priority may be determined according to the type of the physical layer channel transmitted through the Uu and the sidelink. For example, when the physical random access channel (PRACH) is transmitted through the Uu and sidelink transmission is performed at the same time, the UE may abandon sidelink transmission and perform Uu link transmission. This may mean that the PRACH of the Uu always has a high priority regardless of the physical layer channel transmitted through the sidelink. The above example can be applied to a case in which Uu and sidelink transmissions are performed in different cells (or different component carriers) and to a case in which Uu and sidelink transmissions are performed in the same cell.

As another example of determining the priority according to the type of the physical layer channel transmitted through the Uu and the sidelink, the following may be considered. Physical layer channels and signals transmitted through the Uu may include a random access channel (PRACH), an uplink control channel (physical uplink control channel, PUCCH), an uplink data channel (physical uplink shared channel, PUSCH), and a sounding signal (sounding reference signal, SRS). Physical layer channels and signals transmitted through the sidelink may include a sidelink synchronization channel (sidelink synchronization signal block, S-SSB), a sidelink control channel (physical sidelink control channel, PSCCH), a sidelink data channel (physical sidelink shared channel, PSSCH), a sidelink feedback channel (physical sidelink feedback channel, PSFCH), and a sidelink reference signal (sidelink channel state information reference signal, S-CSI-RS). The priority may be defined by using one of the following methods according to various combinations of the above channels.

Example 1: A Uu channel may have a higher priority than a sidelink channel, and a control channel in the Uu or sidelink may have a higher priority than a data channel. For instance, PRACH>PUCCH with HARQ-ACK and/or SR (scheduling request) or PUSCH with HARQ-ACK>PSFCH with HARQ-ACK or PSSCH with HARQ-ACK>PUCCH with CSI or PUSCH with CSI>PSFCH with CSI or PSSCH with CSI>PUSCH>PSCCH>PSSCH>SRS>S-CSI-RS. In the above example, the PSCCH and the PSSCH may have the same priority. Also, in the above example, the SRS and the S-CSI-RS may have the same priority. The above example can be applied to a case in which Uu and sidelink transmissions are performed in different cells (or, different CCs) and to a case in which Uu and sidelink transmissions are performed in the same cell (or, the same CC).

Example 2: A sidelink channel may have a higher priority than a Uu channel, and the control channel in the sidelink or Uu may have a higher priority than the data channel. For instance, PSFCH with HARQ-ACK or PSSCH with HARQ-ACK>PRACH>PUCCH with HARQ-ACK and/or SR (scheduling request) or PUSCH with HARQ-ACK>PSFCH with CSI or PSSCH with CSI>PUCCH with CSI or PUSCH with CSI>PSCCH>PSSCH>PUSCH>S-CSI-RS>SRS.

As another instance, the PRACH may have the highest priority in the above example. That is, PRACH>PSFCH with HARQ-ACK or PSSCH with HARQ-ACK>PUCCH with HARQ-ACK and/or SR (scheduling request) or PUSCH with HARQ-ACK>PSFCH with CSI or PSSCH with CSI>PUCCH with CSI or PUSCH with CSI>PSCCH>PSSCH>PUSCH>S-CSI-RS>SRS. In the above example, the PSCCH and the PSSCH may have the same priority. Also, in the above example, the SRS and the S-CSI-RS may have the same priority. The above example can be applied to a case in which Uu and sidelink transmissions are performed in different cells (or, different CCs) and to a case in which Uu and sidelink transmissions are performed in the same cell (or, the same CC).

Method 2: Distribution of transmission power according to configured priority

The NR V2X UE may transmit sidelink control information (SCI) for controlling PSSCH, PSFCH or S-CSI-RS transmission to be transmitted by it through the PSCCH. Here, the NR V2X UE may receive priority information for PSSCH, PSFCH or S-CSI-RS transmission to be transmitted by it from a higher layer (e.g., application layer). This priority information may be composed of N bits and may be included in the SCI. For example, if the priority information is composed of 3 bits, 000 indicates a priority of '0' and 111 indicates a priority of '7', so it can be seen that there are a total of 8 levels of priority. Here, the smaller value may take precedence. The gNB may configure the threshold value of priority for the NR Uu and NR sidelink to the UE through system information (SIB) or UE-specific RRC configuration. The NR V2X UE may compare the threshold value for the priority configured by the gNB with the priority value included in the aforementioned SCI field. When the priority value of the sidelink is smaller than the threshold value configured by the gNB, the NR V2X UE may abandon Uu transmission and perform sidelink transmission (that is, the transmission power distributed to the NR link is distributed so that the transmission power of the Uu is set to 0 and the remaining transmission power is used for sidelink transmission). Conversely, when the priority value of the sidelink is greater than the threshold value configured by the eNB, the UE may abandon sidelink transmission and perform Uu transmission (that is, the transmission power distributed to the NR link is distributed so that the transmission power of the sidelink is set to 0 and the remaining transmission power is used for Uu transmission). This operation may be applied when CA is not applied to the sidelink, or when CA is applied to the sidelink but the cell (or CC) in which the NR Uu is transmitted and the cell in which the sidelink is transmitted are the same.

As another example, there may be a case where CA is applied to the sidelink (i.e., sidelink transmission is performed through two or more carriers) and sidelink transmission is not performed on a carrier through which the Uu is transmitted. For example, it may mean a case in which Uu transmission is performed on component carrier 1 (CC #1) and sidelink transmission is performed on component carrier 2 (CC #2) and component carrier 3 (CC #3). In such a case, when the priority value of the sidelink included in the SCI is smaller than the threshold configured by the gNB, the UE may adjust the transmission power used for Uu transmission while maintaining the transmission power used for sidelink transmission. Here, the Uu transmission power may be reduced so that the sum of the transmission power used for sidelink transmission and the transmission power used for Uu transmission is less than or equal to the maximum transmission power (Pcmax) of the UE. Conversely, when the priority value of the sidelink is greater than the threshold value configured by the gNB, the UE may adjust the transmission power used for sidelink transmission while maintaining the transmission power used for Uu transmission. Here, the sidelink transmission power may be reduced so that the sum of the transmission power used for Uu transmission and the transmission power used for sidelink transmission is less than or equal to the maximum transmission power (Pcmax) of the UE. On the other hand, when sidelink transmission is performed on a carrier through which the Uu is transmitted, a transmission power distribution method may be applied as in the case described above where Uu and sidelink transmissions are performed in the same cell or the same component carrier.

FIG. 5A and FIG. 5B may be applied to "scenario 3) a case of transmitting using four links at the same time (NR Uu+NR Sidelink+LTE Uu+LTE Sidelink)" mentioned in FIG. 4. However, since scenario 3) includes scenario 1) and scenario 2), the above description is not limited to scenario 3) and can be extended to scenario 1) and scenario 2). For example, to explain how the transmission power distribution method for scenario 3) can be applied to scenario 2), a transmission power distribution method for simultaneous transmission of "NR sidelink+LTE sidelink+LTE Uu" in scenario 2) can be described as follows, for example.

As described in FIGS. 5A and 5B, even in scenario 2), the power available in the NR link and the LTE link can be distributed first. The transmission power distributed to the NR link may be redistributed to the NR Uu and the NR sidelink, and the transmission power of the NR Uu may be regarded as zero in this case. Hence, the transmission power distributed to the NR link can be allocated in whole to the NR sidelink. Meanwhile, the transmission power distributed to the LTE link may be redistributed to the LTE Uu and the LTE sidelink by using one of the methods described in FIGS. 5A and 5B.

Figure 6A:
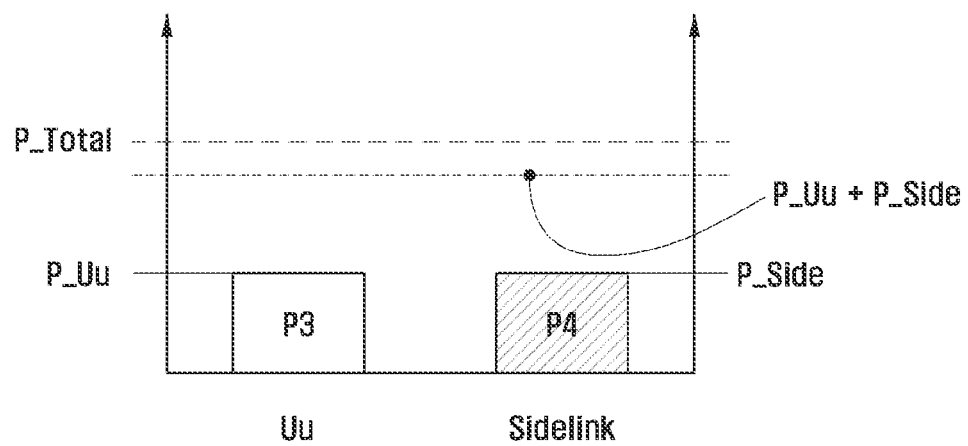
FIG. 6A is another example of transmission power distribution of a V2X UE according to an embodiment of the disclosure.
Figure 6B:
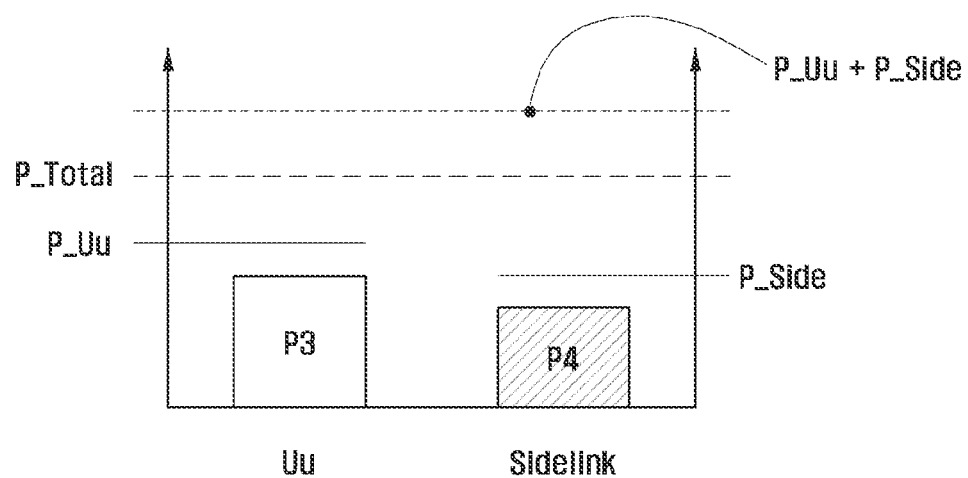
FIG. 6B is another example of transmission power distribution of a V2X UE according to an embodiment of the disclosure.

FIGS. 6A and 6B are other examples of distributing transmission power of a V2X UE according to an embodiment of the disclosure.

In FIGS. 6A and 6B, P_Uu may indicate the maximum transmission power usable for Uu transmission, and P_Side may indicate the maximum transmission power usable for sidelink transmission. Also, P3 may indicate the transmission power actually used for Uu transmission, and P4 may indicate the transmission power actually used for sidelink transmission. Since the actually used transmission power cannot be greater than the allowed maximum transmission power, P3≤P_Uu and P4≤P_Side should be satisfied in FIGS. 6A and 6B. In addition, P_Total shown in FIGS. 6A and 6B is the maximum transmission power value allowed for simultaneous transmission of the Uu and the sidelink. Here, P_Uu, P_Side, P3, P4 and P_Total have linear values, not in units of dB or dBm.

FIG. 6A illustrates a case in which the sum of P_Uu and P_Side is less than P_Total, and FIG. 6B illustrates a case in which the sum of P_Uu and P_Side is greater than P_Total. A case where the sum of P_Uu and P_Side is equal to P_Total is not illustrated in FIGS. 6A and 6B, but it may be included in the category of FIG. 6A. In addition, FIG. 6A shows that P_Uu_P_Side, and FIG. 6B shows that P_Uu>P_Side. However, this is an example, and the methods described in this disclosure may be applied even in a scenario of P_Uu<P_Side. In FIGS. 6A and 6B, Uu transmission may mean simultaneous transmission of the NR Uu and LTE Uu, or transmission through one of the NR Uu and LTE Uu. In addition, sidelink transmission may mean simultaneous transmission of the NR sidelink and LTE sidelink, or transmission through one of the NR sidelink and LTE sidelink.

The NR V2X UE may be configured with information about P_Uu_dBm, P_Side_dBm, and P_Total_dBm through UE-specific RRC parameters after completing the RRC connection with the base station (RRC connected mode) (here, P_Uu_dBm=10 log 10(P_NR), P_Side_dBm=10 log 10(P_LTE) and P_Total_dBm=10 log 10(P_Total)). For example, when the V2X UE establishes an RRC connection with the NR base station (gNB), the V2X UE may receive corresponding information from the gNB. When the V2X UE establishes an RRC connection with the LTE base station (eNB), the V2X UE may receive information about P_Uu_dBm, P_Side_dBm, and P_Total_dBm from the eNB. As another example, when the V2X UE establishes an RRC connection with both the gNB and the eNB, it may receive information about P_Uu_dBm, P_Side_dBm, and P_Total_dBm from the master node. More specifically, the above case may be viewed as a dual connectivity (DC) scenario, and in an LTE-NR DC environment where the eNB serves as a master node, the eNB may configure the corresponding information as RRC parameters to the NR V2X UE. Also, in an NR-LTE DC environment where the gNB serves as a master node, the gNB may configure the corresponding information as RRC parameters to the NR V2X UE.

On the other hand, P_Uu_dBm, P_Side_dBm, and P_Total_dBm may be configured from the base station (gNB or eNB) on which the V2X UE camps through system information (system information block, SIB) other than UE-specific RRC configuration. Here, the V2X UE may be in a state (i.e., RRC idle state) where RRC connection setup is not performed with the base station on which it camps.

From the viewpoint of the base station, when there is an interface between the gNB and the eNB, the gNB and the eNB may negotiate for setting P_Uu and P_Side values through the interface. In this case, the sum of P_Uu and P_Side may be set to be less than or equal to P_Total. However, when there is no interface between the gNB and the eNB, the gNB and the eNB may independently set the P_Uu and P_Side values without negotiation on the P_Uu, P_Side P_NR, and P_Total values. Hence, a case may arise at a specific moment in which the sum of P_Uu and P_Side is greater than P_Total (P_Uu+P_Side>P_Total).

On the other hand, from the viewpoint of the NR V2X UE, when there is an interface between a Uu support modem and a sidelink support modem, the Uu support modem and the sidelink support modem may exchange information about P1 and P2. In this case, even if the base station performs configuration so that P_Uu+P_Side>P_Total in the above example, the NR V2X UE may adjust the transmission power value so that the sum of P3 and P4 is less than or equal to P_Total (P3+P4≤P_Total) through the exchange of information on the transmission power value between the Uu support modem and the sidelink support modem. A UE having this capability can be identified as a UE capable of dynamic power allocation between NR and LTE. On the contrary, when there is no interface between the Uu support modem and the sidelink support modem, information on P3 and P4 cannot be exchanged. In this case, if the base station performs configuration so that P_Uu+P_Side>P_Total in the above example, transmission may have to be performed using only one of the Uu link and the sidelink.

Next, a detailed description will be given of the transmission power distribution operation according to the capability of the UE in various scenario environments exemplified above.

An NR V2X UE that does not have the capability to perform simultaneous transmission through the Uu and the sidelink cannot perform simultaneous transmission through the Uu and the sidelink. Hence, such a UE can transmit using only one of the Uu and the sidelink. In this case, one of the following methods may be applied to which link should be used for transmission.

The NR V2X UE may perform transmission using only one link according to a preset rule. For example, according to the priority of the physical channel transmitted through each link, transmission over a link through which a channel with a lower priority is transmitted may be abandoned, and transmission may be performed only over a link through which a channel with a higher priority is transmitted. For instance, the control channel may have a higher priority than the data channel. That is, when the control channel is transmitted through the Uu and the data channel is transmitted through the sidelink, transmission can be performed only over the Uu through which the control channel is transmitted.

On the other hand, there may be a case in which the control channel is transmitted over both the Uu and the sidelink. In this case, the priority set in advance for individual channels may be followed. A specific example of this will be described in detail later.

As another example, the NR V2X UE may perform transmission through only one link according to the priority provided by the base station through the RRC configuration. More specifically, the gNB or eNB may configure, through RRC parameters, the NR V2X UE with priority values according to the type of data transmitted over the Uu and the sidelink. Based on the configured priority values, the NR V2X UE may abandon transmission over a link through which data of a low priority is transmitted, and may perform transmission only over a link through which data of a high priority should be transmitted.

The NR V2X UE capable of performing simultaneous transmission over the Uu and the sidelink may perform the following operations according to the settings of the base station.

When P_Uu+P_Side≤P_Total is set by the base station
The NR V2X UE may perform simultaneous transmission over the Uu link and the sidelink by setting transmission powers of the Uu link and the sidelink to P3 and P4, respectively. Here, the base station may perform configuration so that P3≤P_Uu and P4≤P_Side are satisfied.

When P_Uu+P_Side>P_Total is set by the base station
The NR V2X UE with a dynamic power allocation capability may adjust the transmission power values so that P_Uu+P_Side≤P_Total is satisfied, and may apply one of the following methods.

The NR V2X UE may adjust both the transmission power values of the Uu and the sidelink. More specifically, the transmission power value of the Uu may be reduced by w3*P_Uu and the transmission power value of the sidelink may be reduced by w4*P_Side. Here, w3*P_Uu+w4*P_Side≤P_Total should be satisfied. w3 and w4 mean scaling factors for the Uu and the sidelink, respectively, and may have a value between 0 and 1. The NR V2X UE may adjust the transmission power value by determining w3 and w4 values satisfying the conditions 0≤w3≤1 and 0≤w4≤1. As another example, the NR V2X UE may adjust the transmission power value by determining w3 and w4 values satisfying the condition 0≤w3+w4≤1 where w3+w4 has a value between 0 and 1.

The NR V2X UE may reduce the transmission power value for the sidelink without changing the transmission power value for the Uu. This may mean a variation of the above example, where w4 is always set to 1. Here, w3 may have a value between 0 and 1. As another variation of the above example, a scenario where w3 is always set to 1 and w4 has a value between 0 and 1 may be considered.

As another example, according to the priority of a physical channel transmitted through each link, a case where a lower priority channel has a more reduced transmission power value compared to a higher priority channel may be considered. For example, assuming that the control channel has a higher priority than the data channel, the scaling factor for the control channel may be defined as α and the scaling factor for the data channel may be defined as β. Here, the α value may always be greater than the β value. Hence, when the control channel is transmitted through the Uu and the data channel is transmitted through the sidelink, the transmission power values may be adjusted so that α*P_Uu+β*P_Side≤P_Total is satisfied. Conversely, when the control channel is transmitted through the sidelink and the data channel is transmitted through the Uu, the transmission power values may be adjusted so that β*P_Uu+α*P_Side≤P_Total is satisfied. On the other hand, there may be a case in which both the Uu and the sidelink transmit a control channel or both transmit a data channel. In this case, the priority set in advance for each channel may be followed. Detailed examples of this will be described later.

Meanwhile, for the NR V2X UE that does not have a dynamic power allocation capability, as information on transmission power allocation cannot be exchanged between the Uu support modem and the sidelink support modem of the UE, the transmission power values cannot be adjusted to satisfy P_Uu+P_Side≤P_Total. Hence, the transmission power value may be set by applying at least one of the above-described methods for transmission using only one link. In the above examples, methods for distributing the transmission power to the Uu and the sidelink have been described. However, the Uu may be composed of the NR Uu and LTE Uu, and the sidelink may be composed of the NR sidelink and LTE sidelink. Hence, it may be necessary to redistribute the transmission power, which has been distributed to the Uu and the sidelink, to the NR link and the LTE link. One of the following methods may be considered as a method for transmission power redistribution.

[Method for Distributing Transmission Power to NR Uu and LTE Uu]

Transmission power distributed to the Uu may be redistributed to the NR Uu and LTE Uu by applying at least one of the following methods.

Method 1: Distribution of transmission power according to predefined priority

Transmission power can be distributed to the NR Uu and LTE Uu according to predefined priorities. Here, it may be defined in advance so that all physical layer channels transmitted through the NR Uu have a higher priority than all physical layer channels transmitted through the LTE Uu. Conversely, it may be defined in advance so that all physical layer channels transmitted through the LTE Uu have a higher priority than all physical layer channels transmitted through the NR Uu.

As another illustration, the priority may be determined according to the type of the physical layer channel transmitted through the NR Uu and LTE Uu. That is, according to the priority of a physical channel transmitted through each Uu, transmission of the Uu through which a channel with a lower priority is transmitted may be abandoned, and transmission may be performed only on the Uu through which a channel with a higher priority is transmitted. For example, when the PRACH is transmitted through the NR Uu and, at the same time, a physical channel other than the PRACH (e.g., PUCCH or PUSCH) is transmitted through the LTE Uu, the UE may abandon LTE Uu transmission and perform NR Uu transmission (that is, the transmission power distributed to the Uu is distributed so that the transmission power of the LTE Uu is set to 0 and the remaining transmission power is used for NR Uu transmission). Conversely, when a physical channel other than the PRACH is transmitted through the NR Uu and, at the same time, the PRACH is transmitted through the LTE Uu, the UE may abandon NR Uu transmission and perform LTE Uu transmission (that is, the transmission power distributed to the Uu is distributed so that the transmission power of the NR Uu is set to 0 and the remaining transmission power is used for LTE Uu transmission). The following method may be applied as the priority for a case in which a physical layer channel other than the PRACH is transmitted through the NR Uu and LTE Uu.

The control channel may have a higher priority than the data channel. For example, PRACH>PUCCH with HARQ-ACK and/or SR (scheduling request) or PUSCH with HARQ-ACK>PUCCH with CSI or PUSCH with CSI>PUSCH>SRS.

As another example, unlike the above example where the transmission power is set to 0, the transmission power of the NR Uu or LTE Uu may be reduced so that the sum of transmission powers used for Uu transmission is less than or equal to the maximum transmit power (Pcmax) of the UE. Here, the transmission power of the LTE Uu may be reduced while maintaining the transmission power of the NR Uu (without reducing the transmission power), or the transmission power of the NR Uu may be reduced while maintaining the transmission power of the LTE Uu.

Method 2: Distribution of transmission power according to configured priority

The base station (eNB or gNB) may configure the priorities of the NR Uu and LTE Uu to the UE through system information (SIB) or UE-specific RRC configuration. The UE may abandon transmission through the Uu having a low priority and perform transmission through the Uu having a high priority (that is, the transmission power distributed to the Uu is distributed so that the transmission power of the Uu having a low priority is set to 0 and the remaining transmission power is used for transmission through the Uu having a high priority).

As another example, the UE may adjust the transmission power used for transmission through the Uu having a high priority by $\gamma 1$ and adjust the transmission power used for transmission through the Uu having a low priority by $\delta 1$. Here, $\gamma 1$ and $\delta 1$ are parameters for adjusting the Uu transmission power, and may each have a value between 0 and 1. Also, $\gamma 1 < \delta 1$.

As another variation of the above example, the UE may adjust the transmission power used for transmission through the Uu having a low priority while maintaining the transmission power used for transmission through the Uu having a high priority. This can be regarded as a case where $\gamma 1$ is always fixed to 1 and $\delta 1$ is used. That is, the transmission power of the Uu having a low priority may be reduced by $\delta 1$ so that the sum of the transmission power used for NR Uu transmission and the transmission power used for LTE Uu transmission is less than or equal to the maximum transmission power (Pcmax) of the UE.

[Method for Distributing Transmission Power to NR Sidelink and LTE Sidelink]

Transmission power distributed to the sidelink may be redistributed to the NR sidelink and LTE sidelink by applying at least one of the following methods.

Method 1: Distribution of transmission power according to predefined priority

Transmission power can be distributed to the NR sidelink and LTE sidelink according to predefined priorities. More specifically, among channels transmitted through each sidelink, it is possible to adjust the transmission power for a channel with a low priority while maintaining the transmission power for a channel with a high priority. Here, the transmission power of the low-priority channel may be reduced so that the sum of the transmission power used for NR sidelink transmission and the transmission power used for LTE sidelink transmission is less than or equal to the maximum transmission power (Pcmax) of the UE. There may be various methods for defining the priority, and at least one of the following methods may be used.

LTE sidelink transmission may always have a higher priority than NR sidelink transmission. In this case, the V2X UE may set the NR sidelink transmission power to 0 (abandoning or dropping sidelink transmission) and perform LTE sidelink transmission (that is, the transmission power distributed to the sidelink is distributed so that the transmission power of the NR sidelink is set to 0 and the remaining transmission power is used for LTE sidelink transmission).

Conversely, it can be defined in advance so that NR sidelink transmission always has a higher priority than LTE sidelink transmission.

The priority may be determined according to the type of the physical layer channel transmitted through the NR sidelink and LTE sidelink. For example, when the NR sidelink synchronization channel (sidelink synchronization signal block, S-SSB) is transmitted through the NR sidelink, the UE may abandon LTE sidelink transmission and perform S-SSB transmission through the NR sidelink. Conversely, when an LTE sidelink synchronization signal (sidelink synchronization signal, SLSS) and physical layer broadcast channel (physical sidelink broadcast channel, PSBCH) are transmitted through the LTE sidelink, the UE may abandon NR sidelink transmission and perform SLSS and PSBCH transmission through the LTE sidelink. This may mean that the physical layer synchronization channel always has a high priority. For the remaining physical layer, the UE may randomly set priorities.

As another example of determining the priority according to the type of the physical layer channel transmitted through the Uu and the sidelink, the priority may be defined through one of the following methods according to the type of the physical layer channel and signal transmitted through the sidelink.

Example 1: The control channel may have a higher priority than the data channel. For example, synchronization channel>PSCCH>PSFCH with HARQ-ACK or PSFCH with CSI>PSSCH with HARQ-ACK or PSSCH with CSI>PSSCH>S-CSI-RS.

Example 2: Priority may be determined according to the type of control information transmitted through the physical layer channel (e.g., HARQ-ACK information may have a higher priority than CSI information). More specifically, synchronization channel>PSCCH>PSFCH with HARQ-ACK or PSSCH with HARQ-ACK>PSFCH with CSI or PSSCH with CSI>PSSCH>S-CSI-RS.

In the above examples, the PSCCH and the S-CSI-RS may have no priority (i.e., may be not considered in priority or may have the lowest priority), and a case where HARQ-ACK is transmitted and a case where CSI is transmitted may have the same priority. Also, a channel through which feedback information is transmitted may have a higher priority than a synchronization channel.

Method 2: Distribution of transmission power according to configured priority

The NR V2X UE may transmit sidelink control information (SCI) for controlling transmission of PSSCH, PSFCH or S-CSI-RS to be transmitted by it through the NR sidelink, through the PSCCH. Here, the NR V2X UE may receive, from a higher layer (e.g., application layer), priority information for transmission of PSSCH, PSFCH or S-CSI-RS to be transmitted by it through the NR sidelink. This priority information may be composed of N bits and may be included in the SCI. For example, if the priority information is composed of 3 bits, 000 indicates a priority of '0' and 111 indicates a priority of '7', so it can be seen that there are a total of 8 levels of priority. Here, the smaller value may take precedence. Similarly, the NR V2X UE may transmit the SCI for controlling transmission of the PSSCH to be transmitted by it through the LTE sidelink, through the PSCCH. Here, the NR V2X UE may receive, from a higher layer (e.g., application layer), priority information for the PSSCH to be transmitted by it through the LTE sidelink. Hence, the NR V2X UE may compare priority information included in the SCI for NR sidelink transmission with priority information included in the SCI for LTE sidelink transmission, and may perform transmission for the high-priority sidelink (that is, the transmission power distributed to the sidelink is distributed so that the transmission power of the sidelink having a low priority is set to 0 and the remaining transmission power is used for transmission through the sidelink having a high priority).

As another example, the UE may adjust the transmission power used for transmission through the sidelink with a low priority while maintaining the transmission power used for transmission through the sidelink with a high priority. Here, the transmission power for transmission through the low-priority sidelink may be reduced so that the sum of the transmission power used for transmission through the high-priority sidelink and the transmission power used for transmission through the low-priority sidelink is less than or equal to the maximum transmission power (Pcmax) of the UE.

FIG. 6A and FIG. 6B may be applied to "scenario 3) a case of transmitting using four links at the same time (NR Uu+NR sidelink+LTE Uu+LTE sidelink)" mentioned in FIG. 4. However, since scenario 3) includes scenario 1) and scenario 2), the above description is not limited to scenario 3) and can be extended to scenario 1) and scenario 2). For example, to explain how the transmission power distribution method for scenario 3) can be applied to scenario 2), a transmission power distribution method for simultaneous transmission of "NR sidelink+LTE sidelink+LTE Uu" in scenario 2) can be described as follows, for example.

As described in FIGS. 6A and 6B, even in scenario 2), the power available in the Uu and the sidelink can be distributed first. The transmission power distributed to the Uu may be redistributed to the NR Uu and LTE Uu, and the transmission power distributed to the sidelink may be redistributed to the NR sidelink and LTE sidelink. Here, the transmission power of the NR Uu may be regarded as zero in in scenario 2). Hence, the transmission power distributed to the Uu can be allocated in whole to the LTE Uu. Meanwhile, the transmission power distributed to the sidelink may be redistributed to the NR sidelink and the LTE sidelink by using one of the methods described in FIGS. 6A and 6B.

Meanwhile, although not mentioned in the disclosure, any combination of the methods described in FIGS. 5A and 5B and FIGS. 6A and 6B may be possible. For example, the transmission power of the NR link and the LTE link may be distributed to P_NR and P_LTE as described in FIGS. 5A and 5B, and, in the NR link, the transmission power distribution between the NR Uu and NR sidelink and the transmission power distribution between the LTE Uu and LTE sidelink may be performed by using the methods of P_Uu and P_Side as described in FIGS. 6A and 6B.

As another example, the transmission power of the Uu and sidelink may be distributed to P_Uu and P_Side as described in FIGS. 6A and 6B, and, in the Uu link, the transmission power distribution between the NR Uu and LTE Uu and the transmission power distribution between the NR sidelink and LTE sidelink may be performed by using the methods of P_NR and P_LTE as described in FIGS. 5A and 5B.

Figure 7:
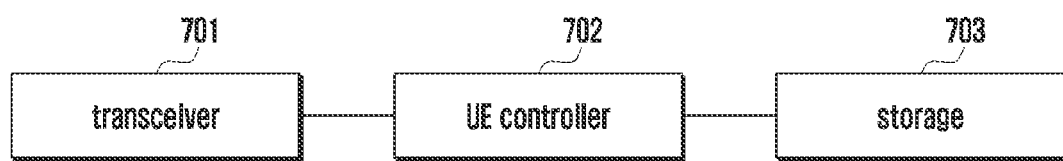
FIG. 7 is a diagram illustrating the structure of a UE according to an embodiment of the disclosure.

FIG. 7 is a diagram illustrating the structure of a UE according to an embodiment of the disclosure.

With reference to FIG. 3, the UE may include a transceiver 701, a UE controller 701, and a storage 701. In the disclosure, the UE controller 702 may be defined as a circuit, an application-specific integrated circuit, or at least one processor.

The transceiver 701 may transmit and receive signals to and from another network entity. The transceiver 701 may perform communication by exchanging signals with, for example, a base station and/or a different UE. The UE controller 702 may control the overall operation of the UE according to the embodiments proposed in the disclosure. For example, the UE controller 701 may control signal flows between blocks so as to perform operations according to the drawings and flowcharts described above.

The storage 703 may store at least one of information transmitted and received through the transceiver 701 or information generated through the UE controller 702.

Figure 8:
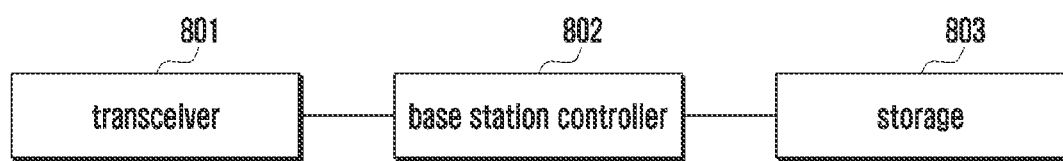
FIG. 8 is a diagram illustrating the structure of a base station according to an embodiment of the disclosure.

FIG. 8 is a diagram illustrating the structure of a base station according to an embodiment of the disclosure.

With reference to FIG. 8, the base station may include a transceiver 801, a base station controller 802, and a storage 803. In the disclosure, the base station controller 802 may be defined as a circuit, an application-specific integrated circuit, or at least one processor.

The transceiver 801 may transmit and receive signals to and from another network entity. The transceiver 801 may perform communication by exchanging signals with, for example, a UE and/or a different network entity, another base station. The base station controller 802 may control the overall operation of the base station according to the embodiments proposed in the disclosure. For example, the base station controller 802 may control signal flows between blocks so as to perform operations according to the drawings and flowcharts described above.

The storage 803 may store at least one of information transmitted and received through the transceiver 801 or information generated through the base station controller 802.

The embodiments disclosed above in the present specification and drawings are only provided as specific examples to easily explain the contents of the disclosure for understanding, and are not intended to limit the scope of the disclosure. Therefore, for the scope of the disclosure, it should be construed that all changes or modifications derived from the disclosure in addition to the embodiments disclosed herein are included in the scope of the disclosure.

The invention claimed is:

1. A method performed by a user equipment (UE) in a wireless communication system, the method comprising:
    transmitting a first sidelink control information (SCI) scheduling a first sidelink signal using a long-term evolution (LTE) radio access and a second SCI scheduling a second sidelink signal using a new radio (NR) radio access, wherein the first SCI includes a first priority field for the first sidelink signal and the second SCI includes a second priority field for the second sidelink signal;
    identifying whether a transmission of the first sidelink signal and a transmission of the second sidelink signal overlap in time;
    determining, from among the first sidelink signal and the second sidelink signal, a sidelink signal with a highest priority based on the first priority field in the first SCI and the second priority field in the second SCI, in case that the transmission of the first sidelink signal and the transmission of the second sidelink signal overlap in time; and
    transmitting the determined sidelink signal with the highest priority.

2. The method of claim 1, wherein the first priority field and the second priority field are composed of 3 bits, respectively.

3. The method of claim 1, wherein the determining of the sidelink signal with the highest priority comprises:
    comparing a value of the first priority field of the sidelink SSB with and a value of the second priority field; and
    determining a sidelink signal having a lower value, among the value of the first priority field and the value of the second priority field, as the sidelink signal with the highest priority.

4. The method of claim 3, wherein another sidelink signal having a higher value, among the value of the first priority field and the value of the second priority field, is not transmitted.

5. The method of claim 1, wherein the determined sidelink signal with the highest priority is transmitted on a physical sidelink shared channel (PSSCH).

6. A user equipment (UE) in a wireless communication system, the UE comprising:
    a transceiver; and
    a controller,
    configured to:
    transmit, via the transceiver, a first sidelink control information (SCI) scheduling a first sidelink signal using a long-term evolution (LTE) radio access and a second SCI scheduling a second sidelink signal using a new radio (NR) radio access, wherein the first SCI includes a first priority field for the first sidelink signal and the second SCI includes a second priority field for the second sidelink signal,
    identify whether a transmission of the first sidelink signal and a transmission of the second sidelink signal overlap in time,
    determine, from among the first sidelink signal and the second sidelink signal, a sidelink signal with a highest priority based on the first priority field in the first SCI and the second priority field in the second SCI, in case that the transmission of the first sidelink signal transmission and the transmission of the second sidelink signal overlap in time, and
    transmit, via the transceiver, the determined sidelink signal with the highest priority.

7. The UE of claim 6, wherein the first priority field and the second priority field are composed of 3 bits, respectively.

8. The UE of claim 6, wherein the controller is configured to:
    compare a value of the first priority field and a value of the second priority field, and
    determine a sidelink signal having a lower value, among the value of first priority field and the value of the second priority field, as the sidelink signal with the highest priority.

9. The UE of claim 8, wherein another sidelink signal having a higher value, among the value of the first priority field and the value of the second priority field, is not transmitted.

10. The UE of claim 6, wherein the determined sidelink signal with the highest priority is transmitted on a physical sidelink shared channel (PSSCH).

* * * * *